United States Patent
Cave et al.

(10) Patent No.: US 6,996,094 B2
(45) Date of Patent: Feb. 7, 2006

(54) SYSTEM AND METHOD FOR PACKET NETWORK MEDIA REDIRECTION

(75) Inventors: Ellis K. Cave, Plano, TX (US); Roland El-Khoury, Flower Mound, TX (US)

(73) Assignee: InterVoice Limited Partnership, Reno, NV (US)

( * ) Notice: Subject to any disclaimer, the term of this patent is extended or adjusted under 35 U.S.C. 154(b) by 937 days.

(21) Appl. No.: 09/772,645

(22) Filed: Jan. 30, 2001

(65) Prior Publication Data

US 2001/0005382 A1 Jun. 28, 2001

Related U.S. Application Data

(63) Continuation of application No. 09/352,795, filed on Jul. 13, 1999.

(51) Int. Cl.
*H04L 12/66* (2006.01)

(52) U.S. Cl. ............... 370/356; 370/410; 379/88.17
(58) Field of Classification Search .......... 370/248, 370/252, 253, 312, 352–356, 389, 392, 400, 370/401, 410, 431, 466, 468, 489; 310/352, 310/383, 390; 379/88.01–88.04, 88.17, 90.01, 379/93.07, 114, 114.15
See application file for complete search history.

(56) References Cited

U.S. PATENT DOCUMENTS

| | | | |
|---|---|---|---|
| 5,590,186 A | * 12/1996 | Liao et al. | 379/211.02 |
| 5,742,675 A | 4/1998 | Kilander et al. | |
| 5,818,912 A | 10/1998 | Hammond | 379/94.05 |
| 6,018,360 A | 1/2000 | Stewart et al. | |
| 6,031,836 A | 2/2000 | Haserodt | |
| 6,175,562 B1 | 1/2001 | Cave | 370/352 |
| 6,195,357 B1 | 2/2001 | Polcyn | 370/402 |
| 6,614,781 B1 | * 9/2003 | Elliott et al. | 370/352 |

OTHER PUBLICATIONS

U.S. Appl. No. 09/163,234, filed Sep. 29, 1998, Michael J. Polycn.
U.S. Appl. No. 09/352,795, filed Jul. 13, 1999, Ellis K. Cave.
"Packet–based Multimedia Communication Systems" H:323, from International Telecommunication Union dated Feb. 1998.

* cited by examiner

*Primary Examiner*—Wellington Chin
*Assistant Examiner*—John Shew
(74) *Attorney, Agent, or Firm*—Fulbright & Jaworski LLP

(57) ABSTRACT

A system and method for a packet VRU which directly utilize packet network protocols, such as those of the H.323 standard, to provide enhanced services via a packet network. The packet VRU generally operates within the packet network and is not required to provide data format translation or multiple device-type access. In a preferred embodiment of the present invention, the packet VRU redirects the media stream from a source so that it is sent directly to a destination, instead of passing through the packet VRU. Alternatively, if the packet VRU must perform processing on the message contents, the packets may be sent to both the destination and to the packet VRU. The packet VRU may still retain call control over the media streams by maintaining the signaling and user input components of the call.

92 Claims, 10 Drawing Sheets

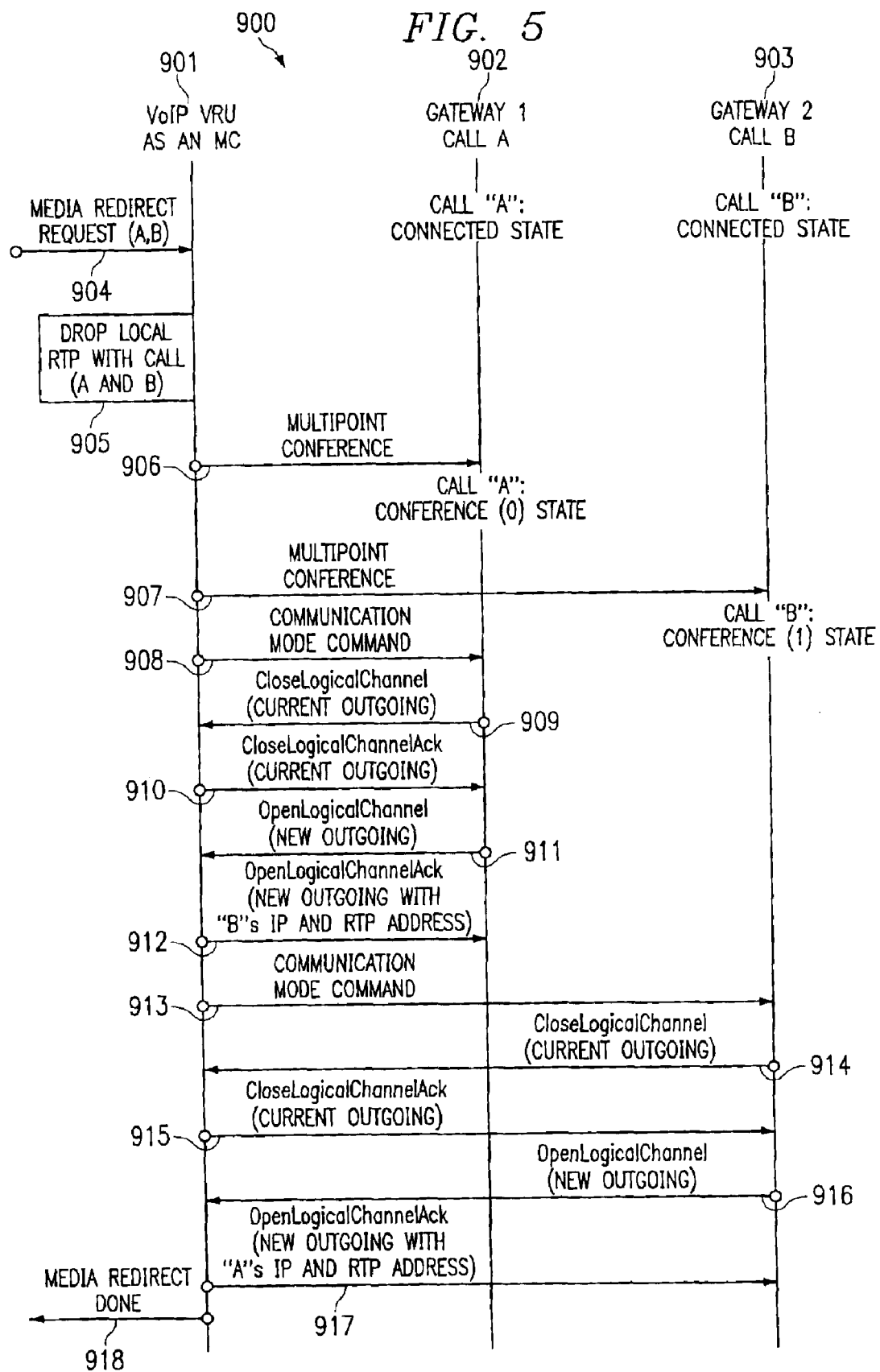

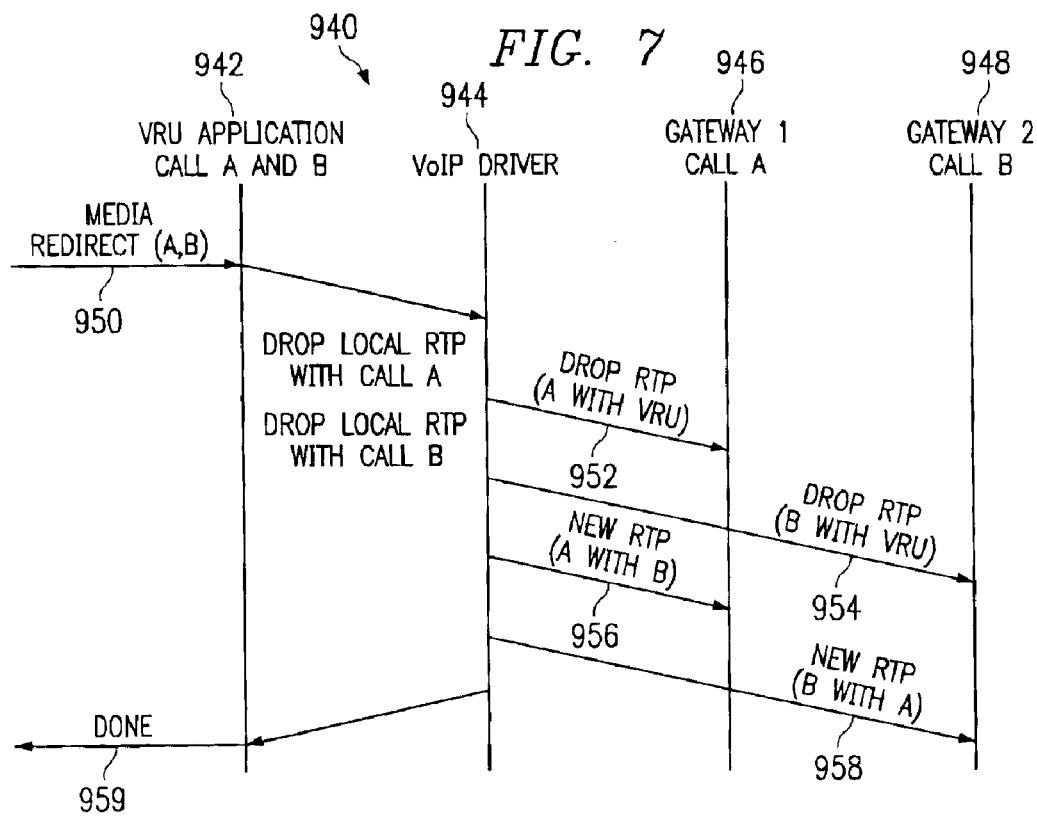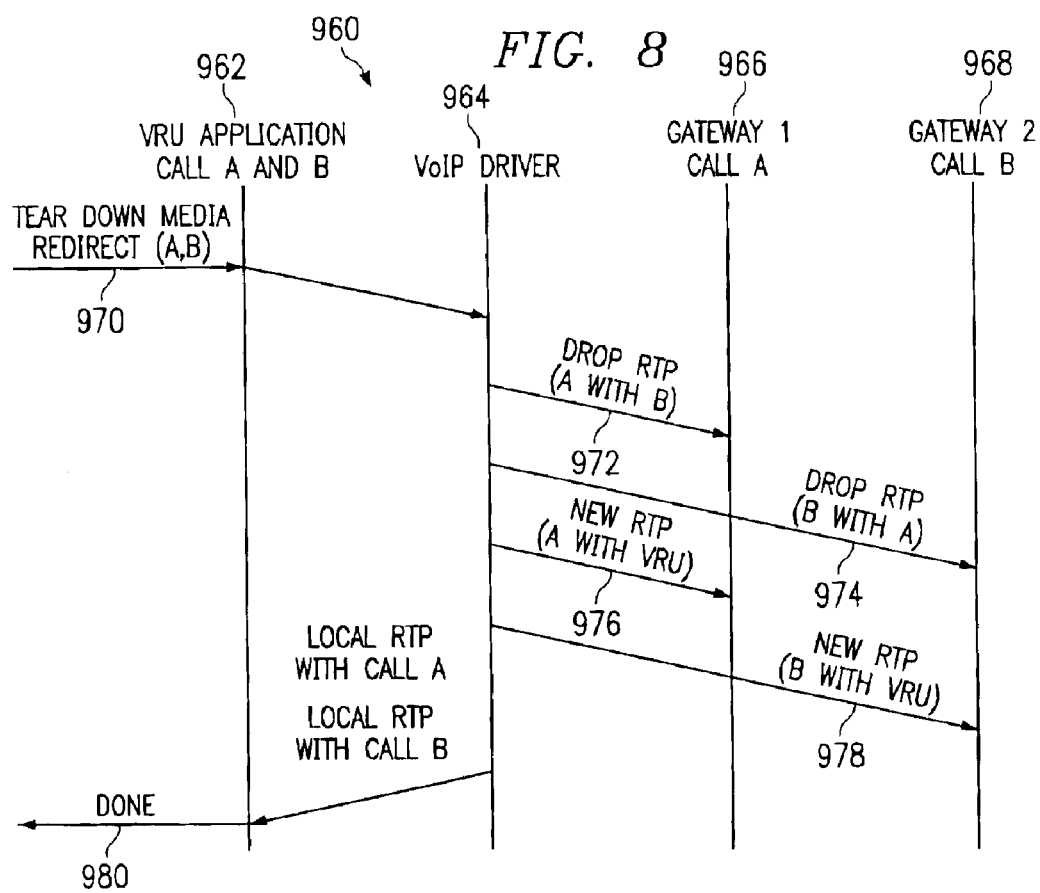

US 6,996,094 B2

SYSTEM AND METHOD FOR PACKET NETWORK MEDIA REDIRECTION

RELATED APPLICATIONS

The present application is a continuation of co-pending and commonly assigned U.S. patent application Ser. No. 09/352,795, entitled SYSTEM AND METHOD FOR PACKET NETWORK MEDIA REDIRECTION, filed Jul. 13, 1999, the disclosure of which is hereby incorporated herein by reference. This is also related to the following commonly assigned, co-pending patent applications: Ser. No. 08/719,163, entiled INTERACTIVE INFORMATION TRANSACTION PROCESSING SYSTEM WITH UNIVERSAL TELEPHONY GATEWAY CAPABILITIES, filed Sep. 24 1996; Ser. No. 08/846,961, entiled SWITCHLESS CALL PROCESSING, filed Apr. 29, 1997; and Ser. No. 09/163,234, entiled INTERACTIVE INFORMATION TRANSACTION PROCESSING SYSTEM ON IP TELEPHONY PLATFORM, filed Sep. 29 1998, which is a continuation of application Ser. No. 08/719,163; all of which applications are hereby incorporated herein by reference.

TECHNICAL FIELD

This invention relates generally to a system and method for facilitating the transfer of information via an asynchronous packet network, and more particularly to a system and method for redirecting media in an asynchronous packet network.

BACKGROUND

Voice Response Units ("VRUs") have existed in the prior art for many years, and are generally defined as robotic systems that automatically interact with one or more persons for the exchange of information and the enhancement of communications. There are numerous enhanced services capable of being provided by a VRU, including voice messaging, automated collect calling, international callback, prepaid & postpaid calling card, store & forward, one number service, find me, follow me, 800/900 service, automated customer service, automated agents or attendants, voice activated dialing, prepaid & postpaid wireless, conferencing, and other such enhanced services.

In the prior art, synchronously switched VRUs were initially connected to the Plain Old Telephone System ("POTS") network (i.e., the Public Switched Telephone Network ("PSTN")) via analog interfaces. Although POTS analog connections still exist, the use of digitized voice transmission is becoming increasingly common on the PSTN. Because of the advantages of digitized transmission, a synchronous VRU is now typically connected to the POTS network via a digital interface, as disclosed in co-assigned U.S. Pat. No. 5,818,912, entitled FULLY DIGITAL CALL PROCESSING PLATFORM, by Daniel Hammond, issued Oct. 6, 1998, which application is incorporated herein by reference. An example of such a VRU is shown in FIG. 1, wherein synchronous VRU 100 is digitally connected to PSTN 102 via Ti trunk 104 using a standard Integrated Services Digital Network ("ISDN") format. Digitized voice signals transmitted over the PSTN normally consume approximately 64 Kilobits-per-second ("Kbps") of bandwidth when digitized and encoded according to the G.711 compressed format using pulse code modulation ("PCM") and the standard µ-law or A-law logarithmic algorithms.

Generally, in the prior art, the PSTN was originally designed to be managed and controlled by a single entity, and later developed such that very few entities control the primary switches that make up the network infrastructure. Generally, because control of the network is centered inside the PSTN switches and because the PSTN switches are of a proprietary nature, very little control over the switching mechanisms is available to other entities that do not own the switches in the network. For example, each specific connection made by VRU 100, e.g., to telephone 106a, generally requires its own port and a 64 Kbps channel. If the enhanced service being provided by VRU 100 requires connecting telephone 106a to another device external to VRU 100, for example to telephone 106c, there are limited options available to VRU 100, each with its own tradeoffs as explained below.

First, PSTN 102 may transfer a call via Release Link Trunking ("RLT") by sending control signals to a switch in the network. For example, a calling party using telephone 106a may wish to call another party at telephone 106c using an 800 calling card service provided by VRU 100. After the calling party enters a Card Number, personal identification number ("PIN") and the phone number for telephone 106c, VRU 100 verifies the information and then connects the two parties using RLT via PSTN 102. In using RLT, VRU 100 gives up control of the call to PSTN 102, although VRU 100 may send the customer's card number and PIN to PSTN 102 for tracking purposes. Generally, a useful and desirable 800 calling card service feature known as call re-origination allows the calling party to disconnect from the called party and reconnect to another called party without breaking the calling party's initial connection. Typically, the calling party on telephone 106a may hold down the # key for more than two seconds to signal to the network the calling party's desire to make a new call, although many other signals and durations may be used. Because VRU 100 has relinquished control of the call to PSTN 102, PSTN 102 must monitor the call for the # key dual-tone multi-frequency ("DTMF") signal so that PSTN 102 may then reconnect the calling party on telephone 106a to VRU 100. PSTN 102 also sends the customer ID and PIN back to VRU 100 so that the customer does not have to reenter this information. This approach has the advantage of freeing up the VRU ports for other callers, but it requires PSTN 102 to have an application running for tracking the customer's ID and PIN, and for monitoring the call for DTMF signals.

Second, a user such as VRU 100 may use a hook flash to request that PSTN 102 directly connect telephone 106a to telephone 106c. This also has the advantage of freeing up ports on VRU 100, but VRU 100 permanently loses the call context. Unlike RLT, the hook flash does not allow VRU 100 to retrieve the call context from PSTN 102. The VRU then cannot perform important call control or administrative functions such as monitoring, recording, timing, or charging for the phone call. Because the call context is lost for VRU 100, the calling party generally must reenter the Card Number and PIN, in addition to the new destination phone number, and VRU 100 must re-verify the calling party's information. Reentering these numbers can be frustrating to customers, and consumes extra connection time and processing resources.

Alternatively, the connection between the two parties may be bridged between the telephones within VRU 100. Internal synchronous switch 112 and another port and 64 Kbps channel are required to complete the connection to telephone 106c. VRU 100 does not relinquish control of the call to PSTN 102, so VRU 100 may still perform call control and administrative functions. In addition, VRU 100 may monitor the call for DTMF signals. If the calling party using an 800 calling card service wishes to make another call, the calling party may hold the # key for more than two seconds. VRU 100 detects this signal directly, and can disconnect the called party on one port from the calling party on the other port. Because VRU 100 maintained the call context, the calling party's Card Number and PIN do not have to be reentered and re-verified. The calling party may simply enter the new destination phone number, and VRU 100 may then set up a new connection using another port. However, this alternative requires VRU 100 to implement internal switch 112, and uses two circuits in the network and two ports on VRU 100, one for each party. Thus the VRU ports generally stay engaged for the entire duration of the phone call, instead of being made available for use on other phone calls. This is undesirable because unlike a simple switch, VRU ports are generally expensive resources that provide enhanced functions, such as voice recognition, DTMF detection/generation or text-to-speech conversion, for interacting with callers. Normally, the network owners would like to always keep the VRU port busy handling new calls. However, since the VRU ports are used to access the internal switch, the VRU ports are engaged during the entire call, even though the port is idle.

In addition to internal switch 112 and extra network bandwidth used, a VRU bridged connection may also travel over an inordinate amount of distance. For example, a calling party in Houston, Tex., may wish to call another party in New Orleans, La., using an 800 calling card service provided by a VRU. If the VRU is located in either of those cities, then the bridged call does not travel much extra distance compared to the physical distance between the actual parties. If the VRU is located in Los Angeles, Calif., however, the inbound call to the VRU must travel all the way to Los Angeles from Houston, and the outbound call from the VRU must travel all the way to New Orleans from Los Angeles, which is an inefficient use of network resources.

Other problems with synchronously switched networks exist. They generally are expensive to build, difficult to upgrade once built, and not flexible enough to support new multimedia services. In response to these difficulties, along with other factors, there has been a dramatic increase in recent years of the availability of public packet networks, such as the Internet, other wide area networks ("WANs"), and local area networks ("LANs"), to exchange information, for example, in voice format. PSTN circuits generally multiplex digitized voice signals by allocating sequential bits or words in separate conversations to periodic time slots in a time division multiple access ("TDMA") structure. The PSTN requires a switched architecture and point-to-point connections, and the data is transmitted continuously, so PSTN connections use up bandwidth needlessly when voices are silent during a call. On the other hand, packet networks asynchronously send digitized signals in packetized form, where each packet is encoded with a header that references its destination and sequence. The packets are only sent when there is information to send, thus packet networks do not need to send packets when the callers' voices are silent, saving bandwidth.

In a packet network, the packets may follow one of many possible pathways to their destinations before they are reassembled, according to their headers, into a conversation. Generally, this has the disadvantage over the POTS/TDMA method in that the packet headers consume additional bandwidth. The packet header disadvantage is generally believed to be outweighed by the efficiencies in network usage without switched architecture and point-to-point connections because, for example, a synchronous network continuously uses the same bandwidth even if there is no substantive signal to transmit.

In part to promote interoperability in the fast developing packet network technology area, the International Telecommunications Union ("ITU"), located in Geneva, Switzerland and with a World Wide Web ("WWW") site of "http://www.itu.org," has developed the H.323 standard for real-time multimedia (defined herein as including voice, video, data, or any combination thereof) communications and conferencing for packet-based networks. The H.323 standard, entitled "Packet-based Multimedia Communications Systems," released February 1998, is incorporated herein by reference, and is actually an umbrella standard for a series of specifications that describe how multimedia communications occur between terminals, network equipment and services on packet networks (e.g., Internet Protocol ("IP") networks), some of which do not provide a guaranteed Quality of Service ("QoS"). The standard is based on the Internet Engineering Task Force ("IETF") real-time transport protocol ("RTP") and real-time transport control protocol ("RTCP"), with additional protocols for call signaling and data and audiovisual communications. Another protocol, the resource reservation protocol ("RSVP"), may be implemented in routers to establish and maintain requested transmission paths and QoS levels. Generally, a protocol that guarantees a QoS level has mechanisms for ensuring the on-time delivery of traffic signals, recovering lost packets, and guaranteeing bandwidth availability for specific applications.

Some of the specifications referenced by the H.323 standard include call control and framing specifications, such as H.225, Q.931, and H.245, audio codec specifications, such as G.711 for high bit rate connections and G.723 for low-bit-rate connections, video codec specifications, such as H.261 for high bit rate connections and H.263 for low-bit-rate connections, and data communications specifications, such as T.120 standards. The H.323 standard defines several entities that may exist on a packet network: terminals, Multipoint Control Units ("MCUs"), gatekeepers, and gateways. Terminals support at least voice communications and optionally support multimedia communications, and include such components as personal computers and IP phones with at least voice capability and optionally multimedia capability. MCUs support conferencing for three or more network endpoints. Gatekeepers provide network management and virtual Private Branch Exchange ("PBX")-type capabilities, such as call control services like address translation for network endpoints. Gateways support at least voice and optionally multimedia inter-networking for connecting IP packet-based networks with circuit-switched networks, and provide translations between different transmission formats, communications procedures, and codecs.

A synchronous VRU may interface with an asynchronous packet network via a PSTN/packet gateway. A PSTN/packet gateway converts TDMA voice signals received, for example, over a standard PSTN line, into packetized voice signals, and vice versa, and allows the resources in the PSTN network to exchange information with resources in the packet network. Generally, the PSTN/packet gateway also performs conversion of analog signals to digital signals (if required), or accepts the $\mu$-law encoded digital signals directly from the PSTN. The gateway may optionally compress the digitized signals from $\mu$-law (about 64 Kbps) down to as low as about 5 Kbps before packetizing (and vice versa). The packetized voice signals may be multiplexed with numerous other signals for transmission over a data line. A typical application of such a PSTN/packet gateway is providing an alternative to making a long distance call. Instead of making a long distance connection where the network uses digital TDMA lines at approximately 64 Kbps of bandwidth per call, callers may make a local POTS call to a PSTN/packet gateway. The gateway may digitize, if necessary, and optionally compress the incoming signal down to about 5 or 6 Kbps. The gateway then packetizes the signal. These packetized signals may then be multiplexed and routed in bulk very cheaply over long distances on a data grade network. At the other end, another PSTN/packet gateway receives and reassembles the packetized signal, and then decompresses the signal, if necessary, and converts it back into a TDMA-multiplexed signal. Resources at the distant gateway then make another local POTS call to complete the connection between the calling party and the receiving party.

A synchronous VRU connected to a PSTN/packet gateway may provide the enhanced services described above, and take advantage of the additional capabilities of the packet network. Such a system is one of the systems discussed in co-assigned, co-pending patent application Ser. No. 08/719,163, entitled INTERACTIVE INFORMATION TRANSACTION PROCESSING SYSTEM WITH UNIVERSAL TELEPHONY GATEWAY CAPABILITIES, by Michael Polcyn, filed Sep. 24, 1996. An example of such a system is shown in FIG. 2. As discussed in application Ser. No. 08/719,163, the VRU (i.e., Interactive Voice Response Unit ("IVR")) may be an automated voice resource known in the art, such as the "OneVoice" or "IN*Control" platforms, available from InterVoice, Inc., 17811 Waterview Parkway, Dallas, Tex., 75252. Ports on the VRU receive individual communications, and resources in the VRU perform processing to make communications in one format (e.g., asynchronous data in the packet network) understandable to communications in other formats (e.g. synchronous data in the POTS network).

In the example system shown in FIG. 2, synchronous VRU 200 connects to PSTN 202 via T1 trunk 204, as in FIG. 1. In addition, VRU 200 connects to PSTN/packet gateway 214 via T1 trunk 212, and gateway 214 is connected asynchronously to packet network 216. If telephone 218 is physically located in a different area than VRU 200, access to VRU 200 via the POTS network may require a long distance phone call. To reduce the cost of this connection, telephone 218 may access PSTN 220, which in turn provides a synchronous connection to gateway 224 via T1 trunk 222. Because data in PSTN 220 is in G.711 format, gateway 224 may translate the data into G.723 compressed format for transmission over asynchronous packet network 216, or gateway 224 may leave the data in G.711 format and not change the compression format for transmission over packet network 216. Gateway 224 also provides the appropriate headers for routing the packets to gateway 214. Gateway 214 may then decompress the reassembled packets, if necessary, from G.723 format and translate the data into G.711 format for transmission to VRU 200 over T1 trunk 212. As with the system in FIG. 1, each specific connection made by VRU 200 generally requires a port and a 64 Kbps channel on T1 trunk 212. If the enhanced service being provided by VRU 200 requires connecting telephone 218 to another device external to VRU 200, for example to telephone 206 or telephone 232, then internal synchronous switch 238 and another port and 64 Kbps channel are required to complete the connection. In addition, if the connection to the external device is back through gateway 214 and packet network 216, the entire sequence of compression/decompression, if necessary, and translation must be performed again.

SUMMARY OF THE INVENTION

While a synchronous VRU connected to a gateway may take advantage of many of the benefits of a packet network over a switched network (e.g., lower cost long distance), this type of implementation is probably best applicable as an interim solution. For example, there may be some drawbacks associated with the implementation described above. First, packet networks, not switched networks, appear to be the dominant type of network for future communications, and thus the synchronous interface in a VRU may become less utilized.

Second, even though a synchronous VRU may be connected to a packet network via a gateway, the VRU still generally requires an internal switch to connect one party to another for many enhanced services, such as calling card and one-number services. When the call media stream passes through the VRU, the application generally uses two ports to complete the connection, and the VRU ports stay engaged in the call for the duration of the call. Typically, prior art VRUs switch synchronous data in G.711 format, which is the same format as used by the switches in the PSTN. Because of this, if data arrives in asynchronous G.711 format, or G.723 format, the data must be converted to synchronous G.711 format so that the VRU can process it.

Third, the repeated conversions from one data format to another data format, such as from G.711 to G.723, or from synchronous to asynchronous, may delay or degrade the data, and also use up processor resources which could be used for other functions more directly related to the core functionality of the VRU.

Another difficulty with a synchronous VRU being connected to a packet network via a gateway is that this VRU is architecturally in the position of a gateway, which is a network "edge" device. These edge devices are generally expected to handle data translations and multiple device-type (e.g., voice, data modem and fax) access to the packet network. However, the digital signal processor ("DSP") power required for voice over Internet protocol ("VoIP") compression, V.90 data modems, or fax modems, for example, is relatively high. In a VRU, this processing power would be better utilized performing enhanced services, such as voice recognition and DTMF detection, which are more directly related to the core functionality of the VRU. Alternatively, the data translation would be better placed in a device which is intended to be a network edge device, such as a gateway, allowing the VRU to function with less processing power, and thus be more cost efficient.

There are many enhanced services provided over the PSTN network that are just as applicable to and useful in a packet-based network. Generally, customers will still want the types of enhanced services provided by VRUs even if they are using a packet network instead of the POTS network, and even if the media contains voice, video, data, or a combination thereof, instead of voice only.

These and other objects, features and technical advantages are generally achieved by a system and method for a packet VRU which directly utilizes packet network protocols, such as those of the H.323 standard, to provide enhanced services in a packet network. The VRU may directly connect to the packet network as a network "core" device, or connect via another network core device, such as an H.323 gatekeeper. In contrast to a network edge device (e.g., a gateway), a network core device (e.g., a gatekeeper or a router) generally operates "within" the packet network and is not required to provide data format translation (e.g., synchronous to asynchronous) or multiple device-type access (e.g., fax and modem). Advantageously, the packet VRU may be built entirely in software running on a network server with a standard packet network connection such as Ethernet or token-ring. The H.323 software protocol may contain all of the call placement, progress, and termination functions, implemented as out-of-band signaling in a format similar to ISDN's Q.931 standard.

In a preferred embodiment of the present invention, a packet VRU may connect two or more parties together via the packet network, such as for an 800 calling card service or for a teleconferencing service. Analogous to the discussion above with respect to the synchronous VRU connected to the PSTN, it is desirable for the packet VRU to be able to connect two or more parties together and still maintain control of the call. This includes call administrative functions, tracking call context, processing input from users, etc. Therefore it is generally useful for a packet VRU to maintain control of the call and receive user input, signaling, or the audio stream, for example to detect user input indication (e.g., DTMF) messages, interpret voice input, or sum voices in a conference call. One way to accomplish this is for the packet VRU to receive and process the packets sent by a source, and then re-transmit the packet information to the proper destinations.

However, there are generally three important sources of delay encountered when transmitting data across a packet network First, there is a delay introduced if the data is compressed by the source. Generally, the source gateway must receive and store enough data in order for it to execute the compression algorithm. Depending on the specific algorithm used, compression can introduce, for example, 30 msec of delay into the signal. Second, there may be a delay introduced by the source converting the data from non-packet form into packet form. Generally, the source gateway must receive and store a certain amount of data to fill a packet, and then generate a header to affix to the packet data. This packetization can introduce, for example, 50 msec of delay into the media transfer. Third, there may be a delay due to the inherent asynchronous nature of a packet network. Generally, packets arrive at a destination at varying times, and may even include overlapping and out-of-sequence packets. For the transferring of data files, this "jitter" generally does not introduce any significant problems because the data is not time critical. For real-time data, however, such as voice, video or multimedia data, a jitter buffer may be necessary to reconstruct the packets into a real-time message. The jitter buffer can introduce, for example, 100 msec of delay into the media stream because it must compensate for the jitter in the arrival of the packets.

These compression, packetization and jitter delays may all be present in any transfer of data from a source to a destination in a packet network. If a packet VRU receives packetized data from a source and then re-transmits the packetized data to a destination, all three delays may be present in each separate media stream (i.e, from the source to the VRU, and from the VRU to the destination). Adding the second set of delays to the transfer may be unacceptable for real-time media communication. In addition, there may be excess delay associated with the transportation of the two (or more) separate media streams in the network, especially if the originating and terminating parties are located close to each other and the packet VRU is located far from the parties. Generally, this delay may be caused both by the increased distance that the signals must travel, and by all the extra routers and switches and other circuitry which the signals must pass through in the network. Users are very sensitive to delay, which can be distracting at the least, and may cause parties to start talking over one another if the delay becomes too excessive, significantly disrupting the conversation. Delay may even cause sufficient user dissatisfaction to push users to seek another service provider.

Accordingly, it is highly desirable for the packet VRU to reduce or avoid these delays, while at the same time maintaining control of the call. In a preferred embodiment of the invention the packet VRU may utilize protocols available in the packet network to redirect a source's media stream from the packet VRU to another destination. In this way the media stream is sent directly to the destination instead of passing through the packet VRU. Alternatively, if the packet VRU must perform processing on the message contents, the packets may be directed to the receiving parties, and in addition continue to be sent to the packet VRU. By redirecting the packets directly to the receiving parties, these embodiments generally avoid any additional compression, packetization and jitter delays that would be introduced by a second subsequent media stream from the VRU to the destination.

In a preferred embodiment, the packet VRU generally redirects only the media streams themselves to be sent directly between the parties. The packet VRU may still retain call control over the media streams by maintaining the signaling and user input components of the call. For example, the RTP/RTCP media streams may be redirected to be sent directly between the gateways, but the H.245 and Q.931 call structures between the gateways and the VRU may be kept intact.

In H.323 VoIP architecture, the DTMF or other user signaling may be taken out-of-band from the RTP streams using H.245 User input indication messages, as described in more detail in section 7.12.6 of the H.245 specification. This feature was specified in the H.323v2 specification because some voice compression schemes destroy in-band DTMF information. This feature was intended to allow out-of-band DTMF information to be sent to the same endpoint as the in-band voice information, but this feature may also be exploited to route the user input to a different endpoint than the RTP media stream. H.245 section 7.12.6 User Input also describes a method to provide DTMF duration information in the UserInputIndication messages using Signal and SignalUpdate parameters. This feature may be used to transfer tone duration information out-of-band from the RTP streams. Tone duration is useful in many applications, such as calling card call re-origination.

Thus in a further preferred embodiment of the present invention, a gateway or browser may convert user input indication signals (e.g., DTMF signals from a telephone, or keyboard input from an IP phone) received from a party connected via the gateway or browser into user input indication messages in an out-of-band channel in the H.323 protocol to be read by the packet VRU, separate from the redirected media streams. This may be especially useful for higher compression schemes (e.g., G.723) which cannot properly compress and decompress user input indication signals in-band with the voice signal. By using user input indication messages, the packet VRU advantageously does not need to receive the media streams if the sole reason is to detect user input indication signals, and this approach also circumvents the digital signal processing associated with in-band user input indication detection. Thus the packet VRU may redirect the media streams to travel directly between the parties without passing through the packet VRU, and still maintain call control, including receiving user input indication messages from the users. Alternatively, if the receiving party also needs to receive user input indication signals, for example if the receiving party is a synchronous VRU monitoring user input indication signals, then either the originating gateway or the packet VRU can send the user input indication messages to the destination gateway, which may then convert the messages back into actual user input indication signals added into the voice signal.

In an alternative embodiment, the packet VRU may solely utilize a voice-recognition user interface and therefore not require user input indication signals at all. Alternatively, if the user input indication signals are implemented in-band with the data channel, a user input indication detector in the packet VRU may be implemented, and for further functionality a user input indication generator may also be implemented in the packet VRU. For these latter two embodiments, in addition to the media streams being transferred directly between the parties, the packet VRU would also need to receive copies of the media streams to process the data contained in them. One example of a standard for user input indication data transfer and reproduction is the "Voice over IP Interoperability Implementation Agreement," developed by the International Multimedia Teleconferencing Consortium ("IMTC"), located in San Ramon, Calif. and with a WWW site of "http://www.imtc.org." The specification, which supports two party voice and voice-band calls over IP networks, is based on H.323 standards and includes other telephony-specific requirements and IP specific needs such as directory services and dynamic IP address resolution mechanisms.

In accordance with a preferred embodiment of the present invention, a method for redirecting media in an asynchronous packet network by a system asynchronously connected to the packet network comprises establishing a first call between a first device and the system via the packet network, wherein the first call comprises a first call control structure and a first media stream, and signaling the first device to redirect the first media stream to a second device, wherein the first call control structure is retained between the first device and the system. In a further aspect of this preferred embodiment, the method further comprises establishing a second call between the system and the second device via the packet network, wherein the second call comprises a second call control structure and a second media stream, and signaling the second device to redirect the second media stream to the first device, wherein the second call control structure is retained between the system and the second device.

In accordance with another preferred embodiment of the present invention, a computer program product having a computer readable medium with computer program logic recorded thereon for use in a system asynchronously connected to a packet network for redirecting media in the asynchronous packet network, comprises code for establishing a first call with a first device via the packet network, wherein the first call comprises a first call control structure and a first media stream, code for establishing a second call with a second device via the packet network, wherein the second call comprises a second call control structure and a second media stream, code for signaling the first device to redirect the first media stream to the second device, and code for signaling the second device to redirect the second media stream to the first device, wherein the first and second call control structures are not redirected away from the system.

In accordance with yet another preferred embodiment of the present invention, a system for redirecting media in an asynchronous packet network comprises an asynchronous interface to the packet network, means for establishing a first call with a first device via the packet network, wherein the first call comprises a first call control structure and a first media stream, means for establishing a second call with a second device via the packet network, wherein the second call comprises a second call control structure and a second media stream, means for signaling the first device to redirect the first media stream to the second device, and means for signaling the second device to redirect the second media stream to the first device, wherein the first and second call control structures are not redirected away from the system.

In accordance with still another preferred embodiment of the present invention, a system for redirecting media in an asynchronous packet network comprises an asynchronous interface to the packet network, a call control server, wherein the call control server sets up call control structures to communicate with devices in the packet network via the asynchronous interface for controlling media streams from and to the devices, a voice media server communicating with the call control server, wherein the call control server uses the call control structures to establish media streams between the devices and the voice media server via the asynchronous interface, and an application server communicating with the call control server and the voice media server, wherein the application server instructs the call control server to redirect the media streams to be transmitted directly between the devices without passing through the system, and wherein the call control structures are retained between the devices and the system.

One advantage of a preferred embodiment of the present invention is that a packet VRU may generally provide the existing enhanced services of a synchronous VRU, but in a packet network environment. Another advantage of a preferred embodiment of the present invention is that a packet VRU may provide enhanced services for multimedia communications in addition to voice-only communications. Because of the added multimedia functionality, a packet VRU may also be described as a packet Multimedia Response Unit ("MRU"), or a packet Interactive Multimedia Response ("IMR") Unit. All such systems may also be referred to as a packet Enhanced Service Provider ("ESP"). Of course, with the added multimedia functionality, new enhanced services, such as video conferencing, shared whiteboarding and text chatting, which were not implemented in voice-only communications, will become desirable, and all such enhanced services are intended to be within the scope of the present invention.

A further advantage of a preferred embodiment of the present invention is that repeated conversions from one data format to another data format are avoided because the media is sent directly from source to destination, and not through the packet VRU. In addition, because the packet VRU is implemented as a core device within the packet network instead of as an edge device, the packet VRU does not need to provide multiple device-type access such as for modems and fax machines. Instead, gateways generally direct only the voice calls to the packet VRU and direct fax and modem calls elsewhere. Also, the packet VRU may not need to provide data format conversion between the packet network and another type of network, such as a switched network, although connecting a combined packet/synchronous VRU to both types of networks may still be desirable for some applications.

A further advantage of a preferred embodiment of the present invention is that a packet network interface generally does not require multiple physical ports and an internal switch for connecting more than one party together for enhanced services such as calling card and one-number services. Instead, any switching/routing is handled in the packet network itself. A single packet network interface may handle all traffic with the packet VRU. For example, a single 100 Mbit Ethernet interface may carry over 10,000 5 Kbit G.723 compressed voice channels plus overhead. Alternatively, more than one packet network interface may be implemented. In addition, multiple parties may be connected by redirecting the media streams to travel directly between the parties, without passing through the VRU. Thus the packet VRU may avoid the delays associated with an internal jitter buffer, internal processing of the packets, and separate media streams from the VRU to each party.

A further advantage of a preferred embodiment of the present invention is that a packet VRU may redirect the media streams and still retain control of the call by keeping the call states between the parties and the VRU intact. Redirecting the media streams may free up valuable resources in the packet VRU, such as voice recognition resources, so that they can be used to handle other calls. In addition, the packet VRU may still receive user input indication messages. This embodiment has a further advantage over a synchronous VRU in that it can perform a function similar to RLT in the PSTN, discussed above, but still monitor for user input indication signals and still keep track of the call context. Thus the packet VRU, and not the network, would monitor for user input indication signals. For example, if the packet VRU redirects a calling card caller's call from a third party to the VRU in response to a user input indication message, the calling card caller would not have to re-enter Card Number and PIN information to make a second calling card call.

Yet another advantage of a preferred embodiment of the present invention is that generally only the amount of bandwidth needed is used in the packet network interface (and throughout the packet network), instead of the 64 Kbps channels generally required for each connection in a switched network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 5 is a flow diagram illustrating a message protocol for redirecting media using communication mode command procedures;

FIG. 7 is a flow diagram illustrating a message protocol for redirecting media using user input indication messages; and FIG. 8 is a flow diagram illustrating a message protocol for tearing down redirected media using user input indication messages.

DETAILED DESCRIPTION

Figure 1:
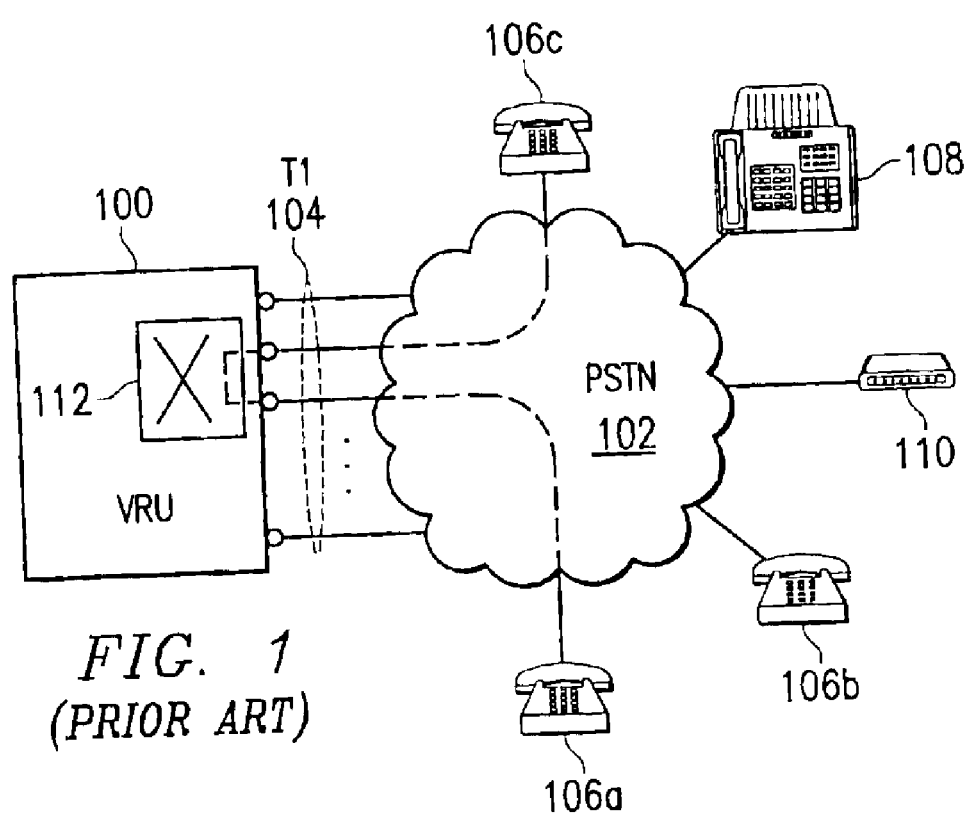
FIG. 1 is a block diagram of a prior art synchronous VRU connected to a PSTN.
Figure 2:
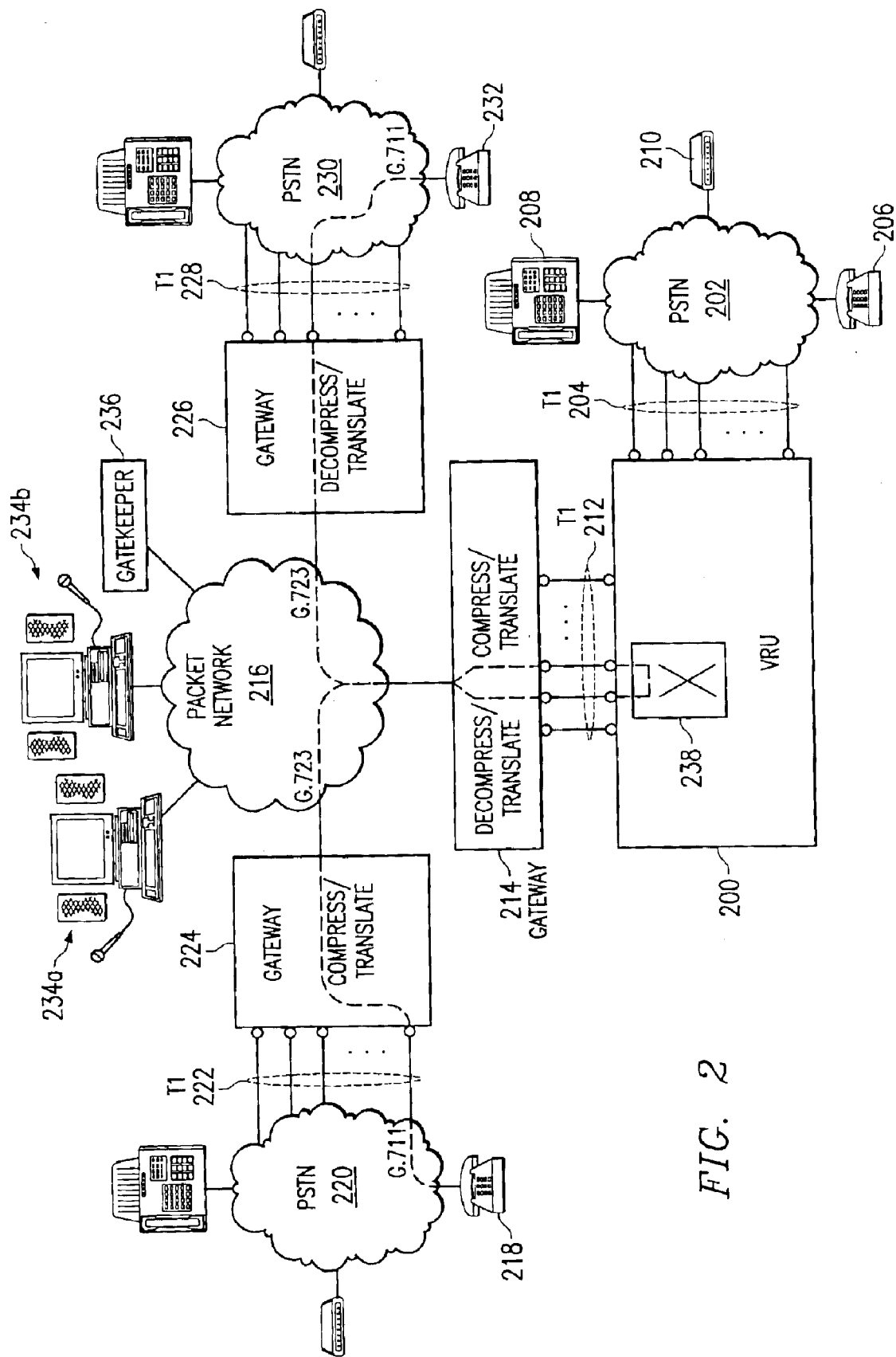
FIG. 2 is a block diagram of a synchronous VRU indirectly connected to a packet network via a gateway.
Figure 3:
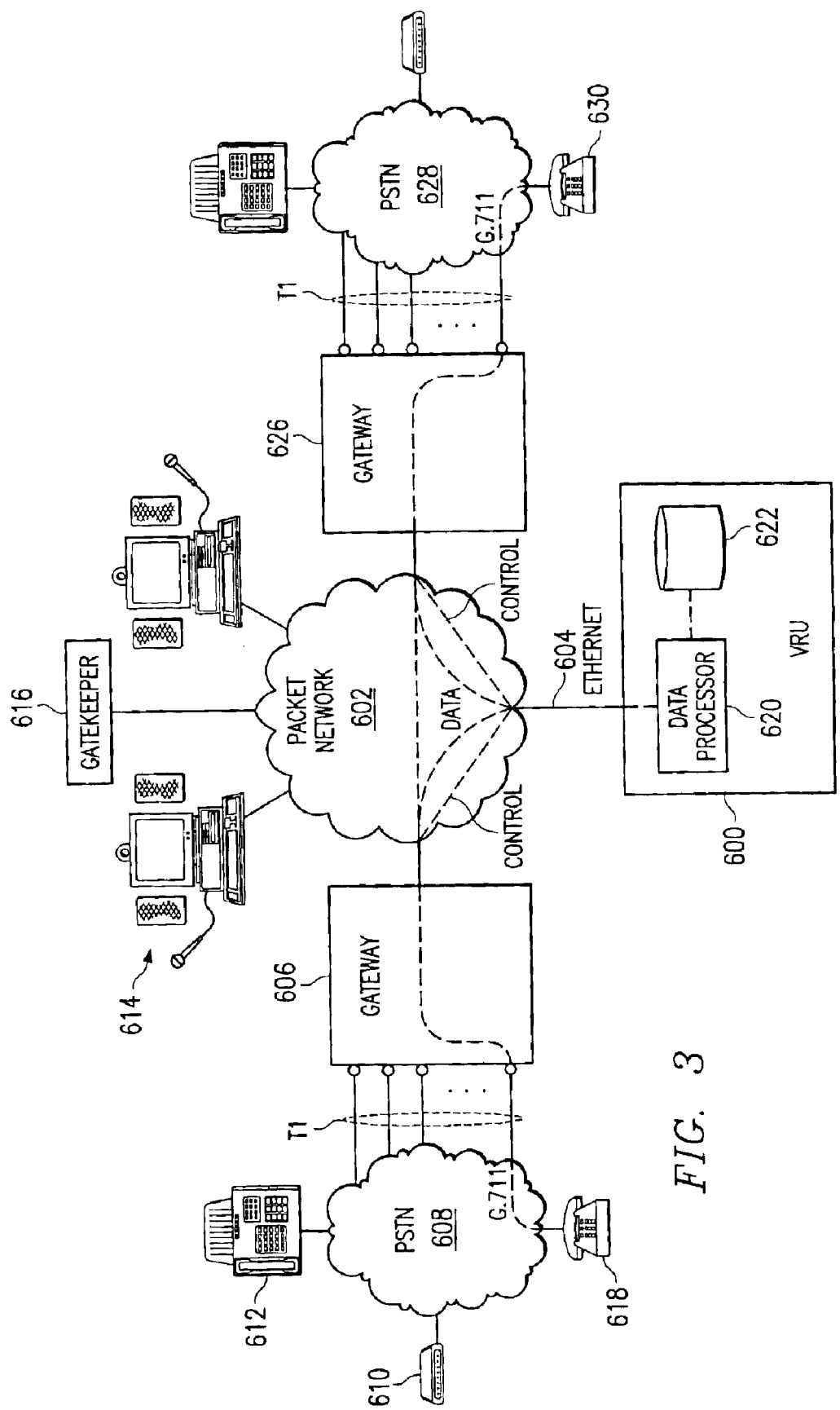
FIG. 3 is a block diagram of a packet VRU implemented on a packet network in which two users are connected to each other from gateway to gateway in a connection controlled by the VRU.

FIG. 3, is a block diagram of a preferred embodiment of the present invention in which packet VRU 600 is connected to packet network 602 via asynchronous Ethernet interface 604. Packet VRU 600 is capable of using H.323 protocols or other packet network protocols to communicate with other devices in packet network 602. In this embodiment, packet VRU 600 communicates directly with gateway 606, via the packet network side, to allow connection of multiple devices that are external to packet VRU 600. By communicating with gateway 606, packet VRU 600 can effectively perform those enhanced services which require switching (e.g., 800 calling card service and one number service) in the synchronous VRUs illustrated in FIGS. 1 and 2, but without requiring an internal hardware switching mechanism.

Packet VRU 600 includes data processor 620 and memory 622. Data processor 620 may be a processor board containing one or more general purpose processors, DSPs, or custom processors. Memory 622 may be any type of typical storage device used in computers such as a magnetic or optical disks, non-volatile or volatile RAM or magnetic tape. Data processor 620 provides control and interactive communication with users and handles user requests, while memory 622 provides storage for outgoing messages or message components and for recording user input.

Similar to the network discussed above with respect to FIG. 2, gateway 606 is connected to packet network 602 via a packet-based interface. Gateway 606 provides a network bridge between packet network 602 and PSTN 608, and thus to the devices connected to PSTN 608, such as telephone 618, data modem 610 and fax machine 612. Other devices which may connect to packet network 602 include multimedia personal computer ("PC") 614 and gatekeeper 616, both of which are capable of using H.323 protocols to communicate with other devices in packet network 602.

In order for telephone 618 to connect to VRU 600, telephone 618 must first connect to originating gateway 606 via PSTN 608, generally using a G.711 data format. Gateway 606 may optionally transcode the G.711 format into a higher compression/lower data rate format, such as G.723 format. Gateway 606 then packetizes the data and attaches the appropriate headers to the packets for transmission to packet VRU 600 across packet network 602. Because packet VRU 600 is connected to packet network 602 as a network core device, packet VRU 600 generally does not need to provide multiple device-type (e.g., voice, fax and data modem) access to the packet network. These functions are performed by gateway 606 as a network edge device in linking PSTN 608 to packet network 602; gateway 606 generally routes only voice calls to packet VRU 600.

An H.323 call using Q.931 signaling and H.245 call control is set up between gateway 606 and packet VRU 600 via packet network 602. Packet VRU may then set up an RTP/RTCP media stream between packet VRU 600 and gateway 606. Generally only media data is transmitted over the media stream, not call control or user input indication signals. To connect telephone 618 to another party, such as telephone 630, packet VRU 600 sends control signals to gateway 606 to redirect the media stream to another device linked to packet network 602, such as destination gateway 626. This preferred embodiment is somewhat similar to RLT in a switched network, but with the important difference that packet VRU 600 can still maintain control of the call because packet VRU 600 does not redirect the call control signals. Advantageously, the extra set of delays associated with the packets first being received and processed by packet VRU 600 and then transmitted to gateway 626 are generally eliminated. In addition, the processing requirements for packet VRU 600 are generally reduced because all routing and data handling can be performed by gateway 606. If packet VRU 600 does not need to process the content of the data stream, it can request that gateway 606 only send the packets across packet network 602 to telephone 630 via gateway 626. Alternatively, packet VRU 600 may request that gateway 606 replicate the data packets and send them to packet VRU 600 for processing, in addition to forwarding the data on to telephone 630. Call control and a return media stream from gateway 626 to gateway 606 may be set up in a manner similar to that described above for gateway 606.

FIGS. 4a–4d illustrate a sequence for redirecting media on a packet network in accordance with another preferred embodiment of the present invention. FIGS. 4a–4d illustrate how to connect a caller to a called party using an 800 calling card enhanced service as an example application. Of course, the inventive concepts are applicable to any enhanced service in which a packet VRU connects a party to one or more other parties via a packet network. In general, the calling party may be a person, such as a customer, or may be a robotic resource, such as another packet VRU. The other party may be another person, such as another customer or an agent, or may be a robotic resource, such as an automated agent, or another VRU. Some of the details shown in FIG. 3, such as fax machines and modems, are omitted from FIGS. 4a–4d for clarity, but the discussions with respect to FIG. 3 are still applicable to the embodiment illustrated in FIGS. 4a–4d.

Figure 4A:
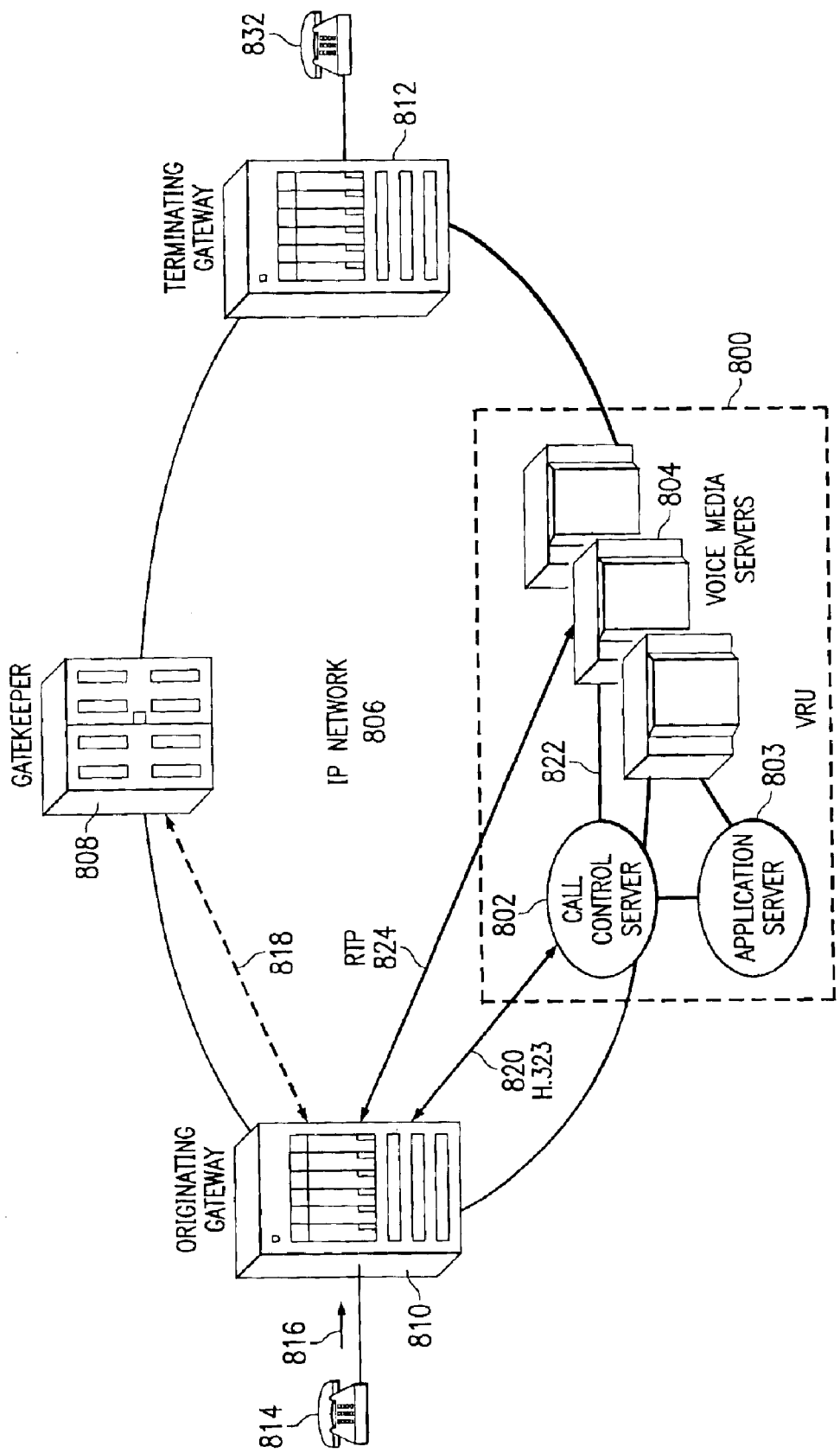
FIGS. 4a–4d are a series of block diagrams illustrating a sequence for redirecting media within a packet network.

With reference to FIG. 4a, there is shown VRU 800 asynchronously connected to IP network 806, for example via an Ethernet connection. VRU 800 includes call control server ("CCS") 802, voice media server(s) ("VMS") 804, and application server 803. An NSP-5000, available from InterVoice, Inc., 17811 Waterview Parkway, Dallas, Tex., 75252, with Calling Card and VoIP capability may be used to implement VRU 800. Domain gatekeeper 808 is also connected to IP network 806, and maintains a directory of IP addresses for the various devices in the network. Also present on the network are gateways with VoIP capability, such as originating gateway 810 and terminating gateway 812 (also referred to herein as destination gateway).

In this preferred embodiment the VRU provides an 800 calling card service. In a standard 800 calling card service, a caller dials the 800 service access number for the VRU. The VRU carries on an interactive dialog with the caller in order to obtain the caller's Card Number, PIN and the PSTN phone number for a desired party with whom the caller wishes to communicate. The VRU verifies the PIN and attempts to connect the caller to the desired party. The 800 calling card service may be a prepaid or postpaid service. In either case, the VRU generally needs to monitor the duration of the phone call in order to charge the caller the correct amount of money for the phone call. If a preset or predetermined limit is in effect, (i.e., either the amount of money on a prepaid calling card, or a ceiling on the amount of credit allowed for a postpaid card), then the VRU also needs to monitor and have control over the phone call so that the call can be terminated if the limit is reached or exceeded.

In FIG. 4a, a caller using POTS telephone 814 dials the 800 service access number. The PSTN network routes the call 816 to originating gateway 810. Preferably, originating gateway is physically located close to the caller, so that minimal cost is incurred in the PSTN network. The service provider for the 800 calling service may have gateways located throughout a country, for example in the major cities in the United States. In a preferred embodiment, the original 800 call is routed to the closest gateway in the PSTN. Alternatively, the original 800 call is always routed to a specific gateway, irrespective of the location of the caller. Originating gateway 810 receives the call from the PSTN, and queries 818 domain gatekeeper 808 via IP network 806 for the PSTN-number-to-IP address translation, which is sent back 818 to gateway 810 by gatekeeper 808.

Originating gateway 810 then establishes H.323 call 820 to CCS 802 in VRU 800. Q.931 call signaling identifies the source and destination and establishes a virtual signal connection between gateway 810 and VRU 800. The signaling connection is established when the H.323 Stack signals that the call is in the connected state. Then the H.245 call control process exchanges capabilities between gateway 810 and VRU 800, and is complete when gateway 810 and VRU 800 have established inbound and outbound logical channels between each other. Once the inbound and outbound logical channels (User Datagram Protocol ("UDP") addresses) are known, an RTP/RTCP session can be established for transferring media streams between gateway 810 and VRU 800.

CCS 802 determines caller ID and called number information from the H.245-Q.931 data. CCS 802 uses the caller ID and called number information to determine the type of service (application) to be applied to the incoming call, in this case 800 calling card service, by application server 803, which initiates the appropriate application. CCS 802 also selects the port in VMS 804 to be used to handle the call, and sends the card application context data 822 to VMS 804. CCS 802 directs originating gateway 810 to send its RTP stream to a media port on VMS 804. Similarly, VMS 804 is directed by CCS 802 to send its RTP stream to originating gateway 810, thus establishing a full duplex audio connection 824 between originating gateway 810 and VMS 804. As discussed hereinabove, gateway 810 is an edge device, and provides for translation between synchronous PSTN and asynchronous IP network 806.

Application server 803 may then command VMS 804 to execute an interactive voice script with the caller to provide voice greetings and menus. The script obtains the caller's Card Number, PIN and the PSTN phone number that the caller wishes to reach, in this case the phone number for POTS phone 832. POTS phone 832 is connected to IP network 806 via the PSTN and gateway 812. Application server 803 validates the Card Number and PIN in its customer card database.

Figure 4B:
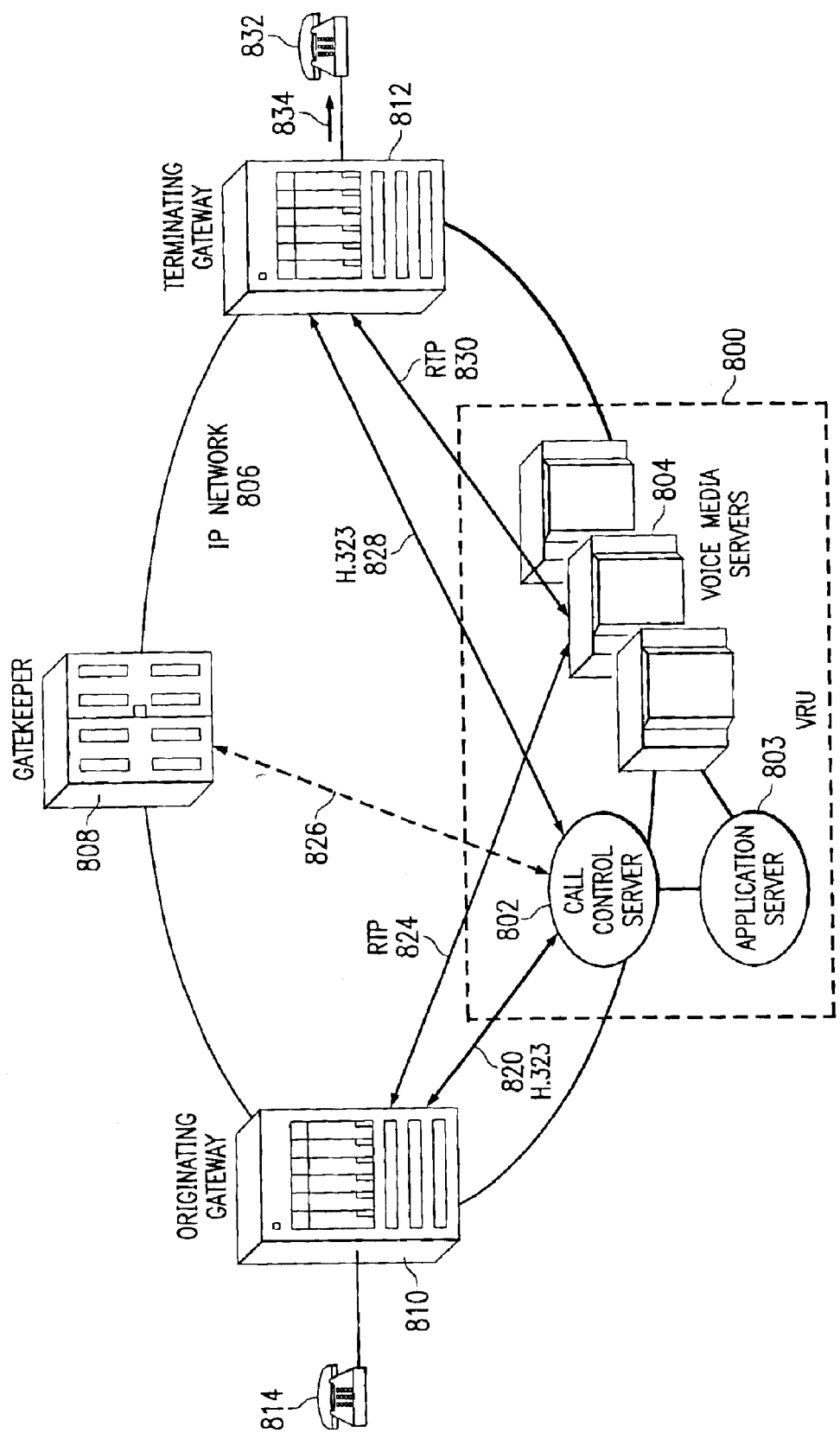

Turning now to FIG. 4b, application server 803 directs CCS 802 to place a separate, secondary call to POTS telephone 832, which has the PSTN number specified by the caller. To accomplish this, CCS 802 first queries 826 gatekeeper 808 to find the IP address of the appropriate gateway to reach the called PSTN number, in this case terminating gateway 812. Gatekeeper 808 returns 826 the IP address of gateway 812 to CCS 802. CCS 802 then places a second H.323 call 828 to terminating gateway 812 by using the IP address provided by gatekeeper 808. When terminating gateway 812 responds to H.323 call 828, CCS 802 directs terminating gateway 812 to send its RTP stream to an IP address on VMS 804. Similarly, VMS 804 is directed to send its RTP stream to terminating gateway 812, thus establishing a second full duplex audio connection 830 (two opposite direction RTP sessions) between terminating gateway 812 and VMS 804.

Finally, to reach the desired party, CCS 802 instructs terminating gateway 812 to extend H.323 call 828 into the PSTN using the POTS number provided by the caller. Terminating gateway 812 complies by placing PSTN call 834 to the called party on POTS phone 832. Application server 803 monitors the call progress, and when answer occurs, application server 803 instructs VMS 804 to execute an interactive voice script with the called party. The script may provide voice greetings with screening and identification of the called party. At this point there are two separate connections established via IP network 806, from POTS phone 814 to VRU 800, and from VRU 800 to POTS phone 832.

Figure 4C:
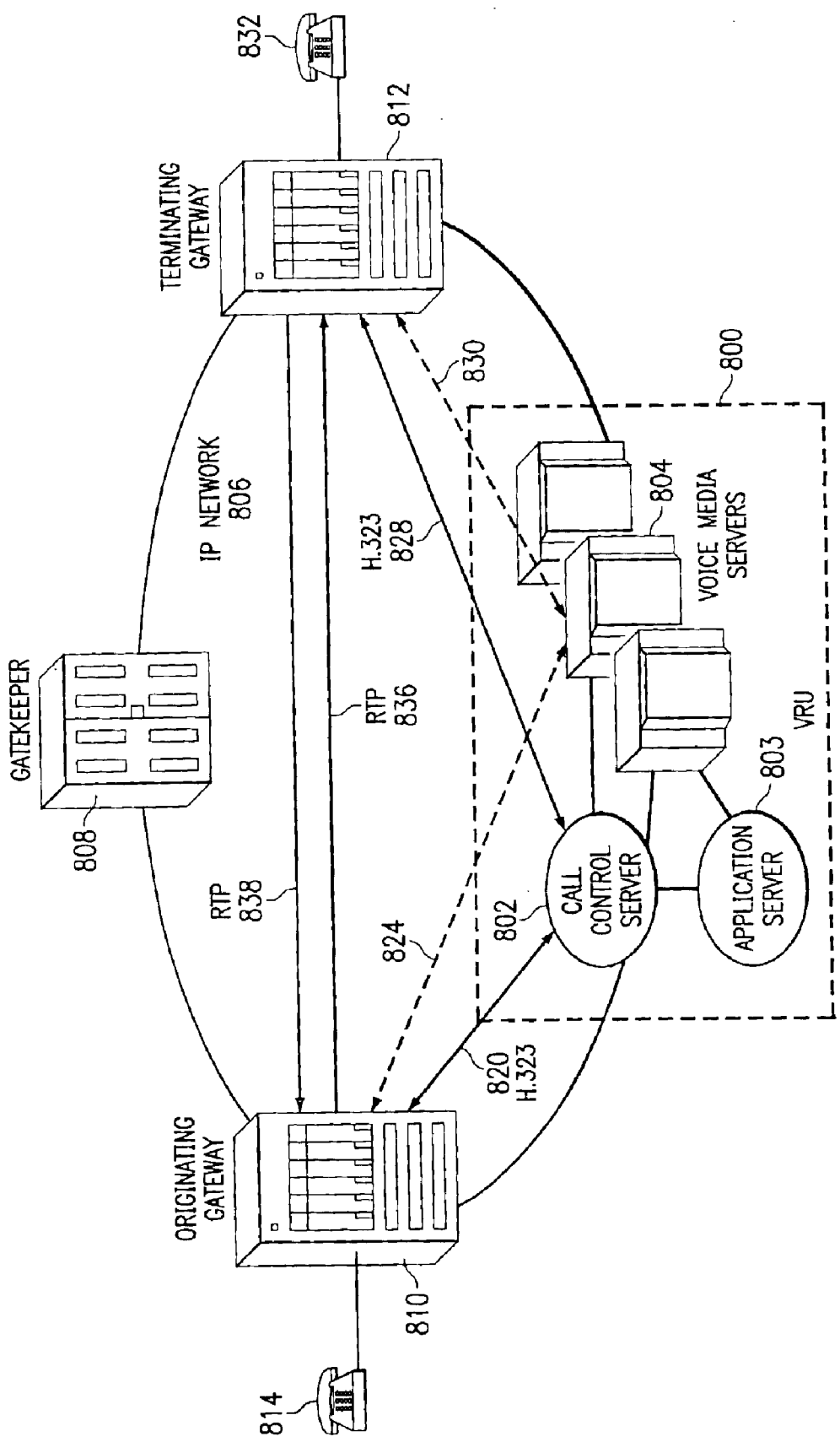

Turning now to FIG. 4c, there is illustrated a preferred embodiment of the invention, in which media sent to VRU 800 is redirected to travel directly between the originating gateway 810 and terminating gateway 812, thus bypassing VRU 800. Once the called party is validated, application server 803 instructs CCS 802 to redirect the media streams. CCS 802 requests that originating gateway 810 and terminating gateway 812 send their respective RTP streams directly to each other, instead of to VMS 804. CCS 802 accomplishes this by tearing down RTP session 824 between originating gateway 810 and VMS 804, and by tearing down RTP session 830 between terminating gateway 812 and VMS 804. Only RTP sessions 824 and 830 are torn down; H.323 call 820 between originating gateway 810 and CCS 802, and H.323 call 828 between terminating gateway 812 and CCS 802, are left connected.

To establish communications directly between the gateways, CCS 802 requests that originating gateway 810 redirects its RTP stream 836 to terminating gateway's 812 media port. Likewise, CCS 802 requests that terminating gateway 812 redirect its RTP stream 838 to originating gateway's 810 media port. Again, the H.323 call states are not modified, only the RTP streams are moved. Thus CCS 802 may still monitor out-of-band user input indication signaling on the originating leg of H.323 call 820 from the calling party via originating gateway 810. VRU 800 may still monitor and control the communication between the calling and called parties via H.323 calls 820 and 828, but data sent between the calling and called parties travels via RTP streams 836 and 838 and no longer needs to pass through VRU 800. Alternatively, for some enhanced services, VRU 800 may still need to monitor the contents of the call between the calling and called parties. In that case, VRU 800 may not tear down the original RTP streams and instead simply establish the new RTP streams, which are copies of the original RTP streams. Once the call is terminated, either by one of the parties or by the VRU, application server 803 instructs CCS 802 to tear down RTP streams 836 and 838, and H.323 calls 820 and 830. VRU 800 may also complete any administrative tasks, such as statistical recording or billing calculation and recording.

Alternatively, a similar approach may be used to establish connections between more than two parties external to VRU 800, for example to provide a conferencing application. VRU 800 sets up multiple H.323 calls and associated RTP media streams to each party participating in the conference, and then redirects the media streams to be transmitted from each party to every other party. The primary difference from the method discussed above with respect to FIGS. 4a–4c is that the media stream from each party is redirected to be transmitted to more than one destination. In one alternative embodiment, the participants or the equipment in their paths, such as their respective gateways, have the ability to perform the summation of the incoming signals themselves, and VRU 800 is not required to receive the media streams. In another alternative embodiment, the participants do not perform the summation of the incoming media streams, so VRU 800 receives each of the media streams, performs the summation of the signals, and sends the media streams out to each of the participants. In either case, and as discussed above, VRU 800 retains control of the call by leaving the H.323 calls intact. Also as discussed above, VRU 800 may still monitor for user input indication messages transmitted via the H.323 calls.

Figure 4D:
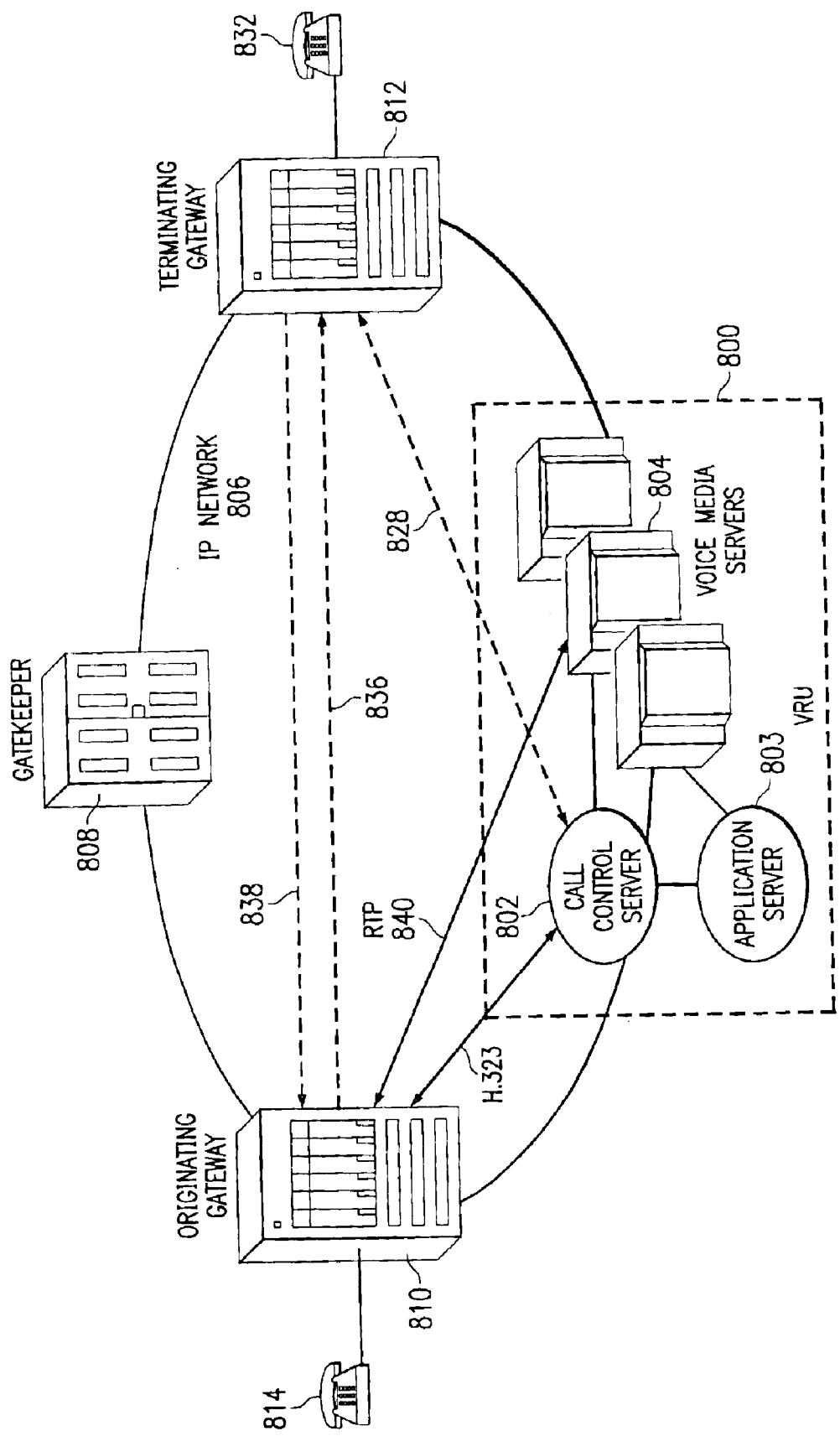

Turning to FIG. 4d, in another preferred embodiment, a caller may wish to place another phone call after completing a prior phone call without repeating the entire procedure of dialing the 800 number and entering in the Card Number and PIN. The only new information required from the caller to perform the re-origination function is the new destination telephone number. To make a new call, caller holds down the pound key on POTS telephone 814 for longer than 2 seconds. Originating gateway 810 relays this signal to CCS 802 via out-of-band user input indication signaling on H.323 call 820. Upon receiving indication that the caller desires to make another telephone call, application server 803 instructs CCS 802 to tear down H.323 call 828 to terminating gateway 812 and RTP streams 836 and 838. Originating gateway 810 may use the key-on key-off UserInputIndication messages for user input indication carriage in accordance with H.245v3. Only originating H.323 call 820 is left active.

To make the new phone call, application server 803 instructs CCS 802 to re-establish a fill-duplex RTP session with a media port on VMS 804, as discussed with respect to RTP stream 824 in FIG. 4a. Also similar to the discussion with respect to FIG. 4a, application server instructs VMS 804 to execute an interactive voice script with the caller The script provides voice greetings and menus. Since the service application has already validated the caller, the script only needs to obtain the next PSTN phone number that the caller wishes to reach. Once the new phone number is obtained, the process is repeated again as discussed with respect to FIGS. 4b–4c. If the caller hangs up, all H.323 calls are torn down and caller context is discarded.

Generally, there are many ways to redirect a media stream in a packet network without affecting call control, and all such systems and methods are intended to be within the scope of the present invention. Media redirection may be implemented using custom functionality in the packet network, or it may be implemented in compliance with a defined methodology, such as by using functionality described in the H.323 specification.

Some of these systems and methods have been tested in the laboratory for viability. The laboratory setup comprised a VRU system including an InterVoice ISA VCD card, a Natural MicroSystems ("NMS") Ag4000 card, an NMS Tx3210 card, NMS Fusion 3.0 software, and application software implementing the media redirect functions described herein. The laboratory setup also comprised two gateway systems, each including an NMS Ag8 card, an NMS T1/RT2 card, an NMS Tx2000 card, NMS Fusion 2.0 software, and a sample application software implementing the gateway functions described herein. The NMS products are available from Natural MicroSystems, 100 Crossing Boulevard, Framingham, Mass., 01702-5406. The Fusion H.323 Stack Programmer's Guide and Reference, NMS P/N 6448-12, incorporated herein by reference, provides more detailed information about the NMS Fusion software.

H.323 section 8.3.5, entitled "Communication Mode Command Procedures" describes functionality that may be used to implement the present invention:

The CommunicationModeCommand can be used to instruct endpoints in a conference (or a point-to-point call) to change modes by indicating a new mode for a mediaChannel that is already in use. It can also be used to tell an endpoint to transmit the media stream to a new address by indicating the mode currently in use, but with new mediaChannel. Similarly, an endpoint that receives a CommunicationModeCommand indicating the mode currently in use and no mediaChannel should close the appropriate channel and the attempt to reopen using the OpenLogicalChannel-OpenLogicalChannelAck sequence, where the OpenLogicalChannelAck contains the address to which the endpoint will send the media.

In accordance with a preferred embodiment of the present invention, FIG. 5 illustrates a message protocol 900 for redirecting media using the Communication Mode Command Procedures. This approach generally uses the communication mode of multicasting and the decentralized conference characteristics described in the H.323 standard. In order to implement media redirection in this manner, the participating gateways generally should support the Conference mode described in section 8.3.5 of the H.323 specification. The VRU generally should be identified as a Multipoint Controller ("MC") entity under the H.323 standard. In addition, to initiate the Conference mode, a VRU generally should be the master terminal endpoint on the call, so the gateway routing calls to the VRU generally should be configured to allow slave status. Preferably, the conferences generally should be of the same data type (e.g., G.711) and have the same data rate (e.g., 64 Kbytes/sec). Alternatively, the media streams may have different data types or data rates, as long as the receiving gateway is capable of decoding the data transmitted to it.

Assume that there are two separate calls, A & B, already in the connected state between a first gateway 902 and VRU 901, and between VRU 901 and a second gateway 903, as discussed hereinabove. The application issues request 904 to connect A and B in media redirect mode. VRU 901, functioning as an MC, sends Multipoint Conference Indication 906 to gateway 902 for call A, putting A into conference mode. Likewise, VRU 901 sends Multipoint Conference Indication 907 to gateway 903 for call B. putting B into conference mode.

VRU 901 then executes the steps to redirect A's RTP media stream. VRU 901 sends Communication Mode Command 908 to instruct gateway 902 about a new multicasting address for Call A. In response, gateway 902 closes the current (previously opened) outgoing logical channel for Call A with VRU 901, and issues the CloseLogicalChannel message 909 to VRU 901. VRU 901 acknowledges the closing of the current outgoing channel for Call A by sending the CloseLogicalChannelAck message 910 to gateway 902. Then gateway 902 opens a new outgoing channel for Call A and issues OpenLogicalChannel message 911 to VRU 901. VRU 901 acknowledges the opening of the new logical channel for Call A with gateway 902 and sends OpenLogicalChannelAck message 912, which contains call B's IP and RTP address, to gateway 902, thus redirecting Call A's media stream to gateway 903.

This sequence is repeated for Call B with gateway 903 in order to redirect Call B's media stream. VRU 901 sends Communication Mode Command 913 to instruct gateway 903 about a new multicasting address for Call B. In response, gateway 903 closes the current (previously opened) outgoing logical channel for Call B with VRU 901, and issues the CloseLogicalChannel message 914 to VRU 901. VRU 901 acknowledges the closing of the current outgoing channel for Call B by sending the CloseLogicalChannelAck message 915 to gateway 903. Then gateway 903 opens a new outgoing channel for Call B and issues OpenLogicalChannel message 916 to VRU 901. VRU 901 acknowledges the opening of the new logical channel for Call B with gateway 903 and sends OpenLogicalChannelAck message 917, which contains call A's IP and RTP address, to gateway 903, thus redirecting Call B's media stream to gateway 902. Upon completion of the media redirection, a media redirect done message 918 is sent to the application indicating that the media redirect is complete.

Figure 6:
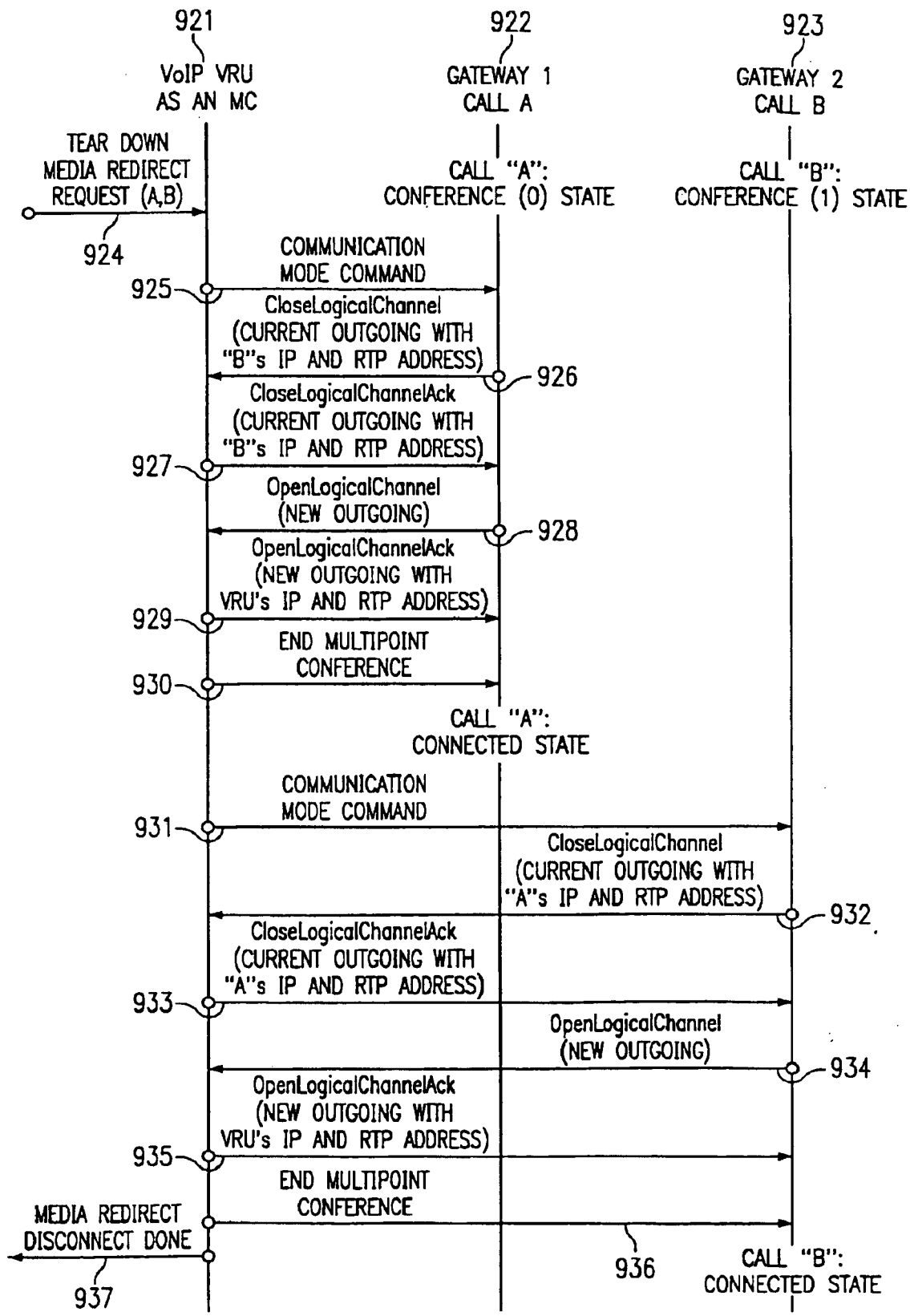
FIG. 6 is a flow diagram illustrating a message protocol for tearing down redirected media using communication mode command procedures.

Once the call is completed, or for another reason, the application may issue request 924 that the redirected media streams be torn down. After tearing down the RTP streams, VRU 921 may either command gateways 922 and 923 to tear down the call controls, or VRU 921 may command gateways 922 and 923 to set up new RTP sessions with VRU 921, similar to the structure that existed before the media redirection. To illustrate the latter option, and with reference to message protocol 920 in FIG. 6, assume that the media redirection illustrated in FIG. 5 has already taken place, and that the media streams are set up directly between gateway 922 and gateway 923 for Calls A and B.

VRU 921 first executes the steps to tear down Call A's redirected RTP media stream. VRU 921 sends Communication Mode Command 925 to instruct gateway 922 about a new multicasting address for Call A. In response, gateway 922 closes the current (previously directed to gateway 923) outgoing logical channel for Call A, and issues the CloseLogicalChannel message 926 to VRU 921. VRU 921 acknowledges the closing of the current outgoing channel for Call A by sending the CloseLogicalChannelAck message 927 to gateway 922. Then gateway 922 opens a new outgoing channel for Call A and issues OpenLogicalChannel message 928 to VRU 921. VRU 921 acknowledges the opening of the new logical channel for Call A with gateway 922 and sends OpenLogicalChannelAck message 929, which contains the IP and RTP address of VRU 921, to gateway 922, thus redirecting Call A's media stream to VRU 921. VRU 921 sends End Multipoint Conference message 930 to gateway 922 to end the conference mode with Call A reverting to a connected state with VRU 921.

This sequence is repeated for Call B with gateway 923 in order to tear down Call B's redirected RTP media stream. VRU 921 sends Communication Mode Command 931 to instruct gateway 923 about a new multicasting address for Call B. In response, gateway 923 closes the current (previously directed to gateway 922) outgoing logical channel for Call B, and issues the CloseLogicalChannel message 932 to VRU 921. VRU 921 acknowledges the closing of the current outgoing channel for Call B by sending the CloseLogicalChannelAck message 933 to gateway 923. Then gateway 923 opens a new outgoing channel for Call B and issues OpenLogicalChannel message 934 to VRU 921. VRU 921 acknowledges the opening of the new logical channel for Call B with gateway 923 and sends OpenLogicalChannelAck message 935, which contains the IP and RTP address of VRU 921, to gateway 923, thus redirecting Call B's media stream to VRU 921. VRU 921 sends End Multipoint Conference message 936 to gateway 923 to end the conference mode with Call B reverting to a connected state with VRU 921. Upon completion of the media redirection tear down, a media redirect disconnect done message 937 is sent to the application indicating that the media redirect tear down is complete.

In these preferred embodiments, all message protocols generally are already available in the H.323 specification, so custom modifications to the gateways are not required, although the gateways generally should be compliant with the relevant sections in the H.323 specification. Upon completion of the call, the redirected media streams may be torn down in accordance with the H.323 specification.

Other embodiments may require some custom functionality to be implemented in the gateways for redirection of the media streams. In accordance with another preferred embodiment of the present invention, FIG. 7 illustrates a message protocol for redirecting media using UserInputIndication messages, and FIG. 8 illustrates an associated message protocol for tearing down the redirected media streams using UserInputIndication messages. To implement this embodiment, the gateways generally must be programmed to respond to special UserInputIndication messages from the VRU. Because the RTP protocol generally is carried over the UDP, and is not associated with the H.245 call context, and because the gateway software does not use the IP address of the call for the RTP media stream, the system can specify different IP addresses and UDP ports to separate the RTP streams from the call control. The VRU may instruct the gateways to keep the dynamic UDP ports valid by using UserInputIndication messages. In addition, the VRU may send a UserInputIndication message to bring back the redirected media streams to have the RTP session established as before the media redirection.

In this embodiment, the message protocol comprises the following:

<Media Redirect Attention><Media Redirect Command><,><DstIpAddress><,>
    <DstRtpUdpAddress><,><DstRtcpUdpAddress><,><SrcIpAddress><,>
    <SrcRtpUdpAddress><,><SrcRtcpUdpAddress><,><RtpSessionMode>

All values are in the ASCII Hex representations. The Media Redirect Attention Command is generally referred to as a "bang," and is defined as <Media Redirect Attention>="!"

The Media Redirect Attention message signals to the gateway that a Media Redirect Command is following. The gateway then interprets the subsequent information as part of the media redirect protocol instead of as some type of DTMF message. There are two primary Media Redirect Commands: DROP_RTP and NEW_RTP, wherein:

<Media Redirect Command>="9" for DROP_RTP Command
    <Media Redirect Command>="5" for NEW_RTP Command Referring to message protocol 940 in FIG. 7, assume that there are two separate calls, A & B, already set up between a first gateway 946 and the VRU, and between the VRU and a second gateway 948, as discussed hereinabove. VRU application 942 initiates media redirection by issuing media redirect command 950 to VoIP driver 944 inside the VRU. VoIP driver 944 then handles the detailed protocol of sending Media Redirect Messages to the gateways to accomplish the media redirection. First VoIP driver 944 sends DROP_RTP A Message 952 to gateway 946 to command gateway 946 to drop the media stream between gateway 946 and the VRU. Similarly, VoIP driver 944 sends DROP_RTP B Message 954 to gateway 948 to command gateway 948 to drop the media stream between gateway 948 and the VRU. VoIP driver 944 then sends NEW_RTP A-to-B Message 956 to gateway 946 to establish the new media stream from gateway 946 to gateway 948. Similarly, VoIP driver 944 then sends NEW_RTP B-to-A Message 958 to gateway 948 to establish the new media stream from gateway 948 to gateway 946. Finally, VoIP driver 944 sends media redirect complete message 959 back to VRU application 942 to indicate completion of the media redirection. As previously discussed, only the media streams are redirected, and the H.245-Q.931 call control structures between the VRU and each gateway are left intact.

Once the call is complete, or for another reason, the VRU may command the gateways to tear down the redirected media streams. After the media streams are torn down, the VRU may either command the gateways to tear down the call controls, or the VRU may command the gateways to set up new RTP sessions with the VRU, similar to the structure that existed before the media redirection. To illustrate the latter option, and with reference to message protocol 960 in FIG. 8, assume that the media redirection illustrated in FIG. 7 has already taken place, and that the media streams are set up directly between gateway 966 and gateway 968. VRU application 962 initiates media redirection tear down by issuing media redirect tear down command 970 to VoIP driver 964 inside the VRU. VoIP driver 964 then handles the detailed protocol of sending Media Redirect Messages to the gateways to accomplish the media redirection tear down. First VoIP driver 964 sends DROP_RTP A-to-B Message 972 to gateway 966 to command gateway 966 to drop the media stream from gateway 966 to gateway 968. Similarly, VoIP driver 964 sends DROP_RTP B-to-A Message 974 to gateway 968 to command gateway 968 to drop the media stream from gateway 968 to gateway 966. VoIP driver 964 then sends NEW_RTP A-to-VRU Message 976 to gateway 966 to reestablish the media stream from gateway 966 to the VRU. Similarly, VoIP driver 964 then sends NEW_RTP B-to-VRU Message 978 to gateway 968 to reestablish the media stream from gateway 968 to the VRU. Finally, VoIP driver 964 sends media redirect complete message 980 back to VRU application 962 to indicate completion of the media redirection tear down. As previously discussed, only the media streams are reestablished between the VRU and the gateways, and the H.245-Q.931 call control structures between the VRU and each gateway continue to remain as they were originally set up.

Another specific media redirection implementation may be to use functions (e.g., CallJoin and CallInvite) described in section 8.4.3 of the H.323 specification, entitled Ad-hoc conference expansion. While preliminary laboratory tests thus far have not allowed the exchange of voice data between call A and call B in the laboratory, a conference in between call A and call B has successfully been established. Therefore the Ad-hoc conference expansion functions may also represent a viable approach for media redirection.

Depending on the specific application, a packet VRU according to the present invention may provide many different enhanced services to users linked to the network, including voice messaging, email (containing at least one of: voice, audio and data), automated collect calling, international callback, prepaid calling card, postpaid calling card, store & forward, one number, find me, follow me, 800/900 service, automated customer service, automated agents or attendants, enhanced fax, voice activated dialing, prepaid & postpaid wireless, conferencing, and other enhanced services. These services may be voice services, similar to the services provided by synchronous VRUs, or may be multimedia services, capable of handling any combination of voice, video and data (e.g., text).

It is understood that a specific implementation of a packet VRU may be accomplished in hardware or software or a combination thereof. It is further understood that packet routing controlled by the packet VRU generally enables point-to-point connections, multi-party conferencing, and broadcast as required. In this way, for example, large conference calls may be enabled, or a feed from the conference may be broadcast to facilitate a radio talk show. It is further understood that consistent with the present invention, the packet VRU may be either collocated with a gateway (on the packet side) or a gatekeeper, or distant therefrom. While not a preferred embodiment in the long term, a packet VRU may also comprise a switched interface to, for example, a PSTN.

It is further understood that the exact order of many of the steps outlined in the methods discussed herein may be altered, and such alterations are intended to be within the scope of the present invention. For example, redirected RTP streams may be set up before or after the original RTP streams are torn down. As another example, when connecting multiple parties, all the H.323 calls may first be set up, followed by the setup of the RTP streams, or each H.323 call and RTP stream pair for a specific party may be set up, followed by the setup for another party. As another example, more than one command may be sent before waiting for the corresponding acknowledge return message. As yet another example, one RTP stream may be completely redirected, then the other RTP stream redirected, or commands may be alternated in some manner in redirecting the RTP streams. In addition, some of the specific commands, especially commands in a custom implementation (e.g., !, 5 and 9), may be changed and still be within the scope of the present invention.

In yet another alternative embodiment, for some applications it may be useful to direct the control calls to the packet VRU as discussed hereinabove, but to immediately direct the media stream to the destination, instead of first directing the media stream to the VRU and then redirecting it to the destination.

It is further understood that while the primary standard discussed above is H.323, other standards may be present on a packet network and are intended to be within the scope of the present invention. For example, Session Initiation Protocol ("SIP"), Simple Gateway Control Protocol ("SGCP") and Media Gateway Controller Protocol ("MEGACO") may alternatively be used to implement media redirection. Each standard has somewhat different functionality, and each has certain advantages and disadvantages with respect to other the standards.

It is further understood that while the core functionality of a packet VRU is enhancing voice communications, it may be possible for any device connected to the packet network may communicate with and utilize the enhanced services of the packet VRU (e.g., a fax machine, data modem or telephone via a gateway, or computers or other terminals connected to the packet network and executing H.323 protocols). It is further understood that, to take advantage of the present invention, a computer user typically requires a multimedia-grade computer, including speakers, sound card, microphone and full duplex voice-enabling software. Alternatively, the computer may also include a video input useful, e.g., in video conferencing. Alternatively, the computer user may use a lower capability computer in combination with a traditional telephone. It is further understood that there are many ways to connect to a packet network, all of which are intended within the scope of the present invention. For example, devices with wireless, satellite or cable interfaces may be linked to the packet network, and may communicate with and utilize the enhanced services of the packet VRU.

Furthermore, while a PSTN may be shown as being divided into different sections in the figures for ease of explanation, it is understood that the sections may all be part of the same nationwide or global PSTN, with some areas accessible locally with little or no variable cost, and some areas accessible by long distance at a variable cost in addition to the local fixed cost access.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing an enhanced calling service comprising:

a first network interface providing interfacing of a first communication device to an asynchronous network, wherein said first network interface includes a processor adapted to controllably direct a first media stream associated with said first communication device to a node in said asynchronous network; and an interactive response process coupled to said asynchronous network and adapted to directly utilize packet network protocols, wherein said interactive response process accepts at least a portion of said first media stream and provides a media stream in response thereto, and wherein said interactive response process provides control signals to said first network interface to direct at least a portion of said first media stream to a node in said asynchronous network other than said interactive response process.

2. The system of claim 1, wherein said enhanced calling service comprises a call payment service.

3. The system of claim 2, wherein said at least a portion of said first media stream accepted by said interactive response process and said media stream provided in response to said first media stream comprises an interactive dialogue between said first communication device and said interactive response process including dialogue with respect to payment of a call.

4. The system of claim 2, wherein said at least a portion of said first media stream accepted by said interactive response process and said media stream provided in response to said first media stream comprises an interactive dialogue between said first communication device and said interactive response process including dialogue with respect to a desired communication device with which said first communication device is to communicate.

5. The system of claim 2, wherein said node in said asynchronous network other than said interactive response process is associated with a called party.

6. The system of claim 5, wherein said node in said asynchronous network other than said interactive response process comprises:
   a second network interface providing interfacing of a second communication device to said asynchronous network, wherein said second network interface includes a processor adapted to controllably direct a second media stream associated with said second communication device to said first network interface under control of said said interactive response process.

7. The system of claim 2, wherein said call payment service comprises a prepaid calling service.

8. The system of claim 2, wherein said call payment service comprises a postpaid calling service.

9. The system of claim 2, wherein said call payment service comprises a collect calling service.

10. The system of claim 1, wherein said enhanced calling service comprises a conference call service.

11. The system of claim 10, wherein said at least a portion of said first media stream accepted by said interactive response process and said media stream provided in response to said first media stream comprises an interactive dialogue between said first communication device and said interactive response process including dialogue with respect to a desired communication device with which said first communication device is to communicate.

12. The system of claim 10, wherein said node in said asynchronous network other than said interactive response process is associated with a conference call party.

13. The system of claim 12, wherein said node in said asynchronous network other than said interactive response process comprises:
   a second network interface providing interfacing of a second communication device to said asynchronous network, wherein said second network interface includes a processor adapted to controllably direct a second media stream associated with said second communication device to said first network interface under control of said interactive response process.

14. The system of claim 12, wherein said processor of said first network interface is adapted to controllably direct a second media stream associated with said first communication device to a node in said asynchronous network, wherein said interactive response process provides said control signals to said processor of said first network interface to thereby direct at least a portion of said first media stream to a first node and at least a portion of said second media stream to a second node, wherein said first node is said node in said asynchronous network other than said interactive response process.

15. The system of claim 14, wherein said control signals provided to said first network interface are operable to cause said first network interface to replicate at least a portion of said first media stream to thereby provide at least a portion of said second media stream.

16. The system of claim 14, wherein said second node comprises said interactive response process.

17. The system of claim 14, wherein said second node comprises a node in said asynchronous network other than said interactive response process and a node in said asynchronous network other than said first node.

18. The system of claim 1, wherein said first network interface comprises a network gateway device.

19. The system of claim 18, wherein said first communication device comprises a telephone.

20. The system of claim 1, wherein said first communication device comprises a multimedia personal computer.

21. The system of claim 1, wherein said first communication device comprises a gatekeeper.

22. The system of claim 1, wherein said first media stream comprises a real-time protocol media stream.

23. The system of claim 1, wherein said processor of said first network interface and said interactive response process establish a first control structure there between, wherein said call control structure is retained between said processor of said first network interface and said interactive response process when said at least a portion of said first media stream is directed to said node in said asynchronous network other than said interactive response process.

24. The system of claim 23, wherein said first control structure provides out of band signaling between said first communication device and said interactive response process.

25. The system of claim 24, wherein said out of band signaling provides information with respect to routing the first media stream to said node in said asynchronous network other than said interactive response process.

26. The system of claim 1, wherein said interactive response process is coupled to said asynchronous network as a network core device.

27. The system of claim 1, wherein said interactive response process is coupled to said asynchronous network via a network core device.

28. The system of claim 27, wherein said network core device is a gatekeeper.

29. The system of claim 1, wherein said interactive response process comprises interactive voice response functionality.

30. The system of claim 1, wherein said interactive response process comprises interactive multimedia response functionality.

31. A method for providing enhanced calling services comprising:
   interfacing a first communication device to an asynchronous network;
   interfacing an interactive response process to said asynchronous network, wherein said interactive response process is adapted to directly utilize packet network protocols;
   directing a first media stream associated with said first communication device to said interactive response process;
   accepting said first media stream by said interactive response process;
   generating a second media stream by said interactive response process responsive to said first media stream;
   directing said second media stream to said first communication device;
   establishing a signaling channel between said first communication device and said interactive response process discrete from said first and second media streams;
   accepting information from said first communication device via said signaling channel; and
   controlling directing of said first media stream by said interactive response process responsive to said accepted information, wherein control of said first media stream is independent of control of said signaling channel.

32. The method of claim 31, further comprising:
  determining the type of enhanced calling services to be performed.

33. The method of claim 32, wherein said determined type of enhanced calling services is selected from the group consisting of a prepaid calling card service, a postpaid calling card service, and a collect calling service.

34. The method of claim 32, wherein said determined type of enhanced calling services is selected from the group consisting of an international callback service, a one number service, a voice activated dialing service, and a conferencing service.

35. The method of claim 31, wherein said enhanced calling service comprises a call payment service.

36. The method of claim 35, wherein said first media stream accepted by said interactive response process and said second media stream generated in response thereto comprise an interactive dialogue between said first communication device and said interactive response process including dialogue with respect to payment of a call.

37. The method of claim 35, wherein said first media stream accepted by said interactive response process and said second media stream provided in response thereto comprise an interactive dialogue between said first communication device and said interactive response process including dialogue with respect to a desired communication device with which said first communication device is to communicate.

38. The method of claim 35, wherein said controlling directing of said first media stream by said interactive response process comprises:
  redirecting said first media stream from said interactive response process to a second communication device interfaced to said asynchronous network while maintaining said signaling channel.

39. The method of claim 38, wherein said second communication device is associated with a called party.

40. The method of claim 38, wherein said redirecting said first media stream comprises:
  directing a third media stream associated with said second communication device to said first communication device.

41. The method of claim 38, wherein said signaling channel is retained between said first communication device and said interactive response process when said first media stream is redirected.

42. The method of claim 41, wherein said signaling channel provides out of band signaling between said first communication device and said interactive response process.

43. The method of claim 42, wherein said out of band signaling provides information with respect to redirecting the first media stream.

44. The method of claim 35, wherein said call payment service comprises a prepaid calling service.

45. The method of claim 35, wherein said call payment service comprises a postpaid calling service.

46. The method of claim 35, wherein said call payment service comprises a collect calling service.

47. The method of claim 31, wherein said enhanced calling service comprises a conference call service.

48. The method of claim 47, wherein said first media stream accepted by said interactive response process and said second media stream provided in response thereto comprise an interactive dialogue between said first communication device and said interactive response process including dialogue with respect to a desired communication device with which said first communication device is to communicate.

49. The method of claim 47, wherein said controlling directing of said first media stream by said interactive response process comprises:
  directing said first media stream to a second communication device interfaced to said asynchronous network.

50. The method of claim 49, wherein said second communication device is associated with a conference party.

51. The method of claim 49, wherein said directing said first media stream to a second communication device comprises:
  signaling an asynchronous network interface associated with said first communication device to replicate said first media stream to thereby provide a first replication of said first media stream and a second replication of said first media stream, wherein said first replication of said first media stream is directed to said second communication device.

52. The method of claim 51, wherein said second replication of said first media stream is directed to said interactive response process.

53. The method of claim 51, wherein said second replication of said first media stream is directed to a third communication device interfaced to said asynchronous network.

54. The method of claim 31, wherein said interfacing said first communication device to said asynchronous network comprises coupling said first communication device to a network gateway device.

55. The method of claim 31, wherein said first communication device comprises a multimedia personal computer.

56. The method of claim 31, wherein said first communication device comprises a gatekeeper.

57. The method of claim 31, wherein said first media stream comprises a real-time protocol media stream.

58. The method of claim 31, wherein said interactive response process is coupled to said asynchronous network as a network core device.

59. The method of claim 31, wherein said interactive response process is coupled to said asynchronous network via a network core device.

60. The method of claim 59, wherein said network core device is a gatekeeper.

61. The method of claim 31, wherein said interactive response process comprises interactive voice response functionality.

62. The method of claim 31, wherein said interactive response process comprises interactive multimedia response functionality.

63. A method for providing call payment services comprising:
  interfacing a first communication device to an asynchronous network;
  interfacing an interactive response process to said asynchronous network, wherein said interactive response process is adapted to directly utilize packet network protocols;
  directing a first media stream associated with said first communication device to said interactive response process;
  accepting said first media stream by said interactive response process;

generating a second media stream by said interactive response process responsive to said first media stream;

directing said second media stream to said first communication device, wherein said first media stream accepted by said interactive response process and said second media stream directed to said first communication device comprise an interactive dialogue between said first communication device and said interactive response process including dialogue with respect to payment of a call and a desired second communication device with which said first communication device is to communicate;

establishing a signaling channel between said first communication device and said interactive response process discrete from said first and second media streams;

accepting information from said first communication device via said signaling channel in accordance with said dialogue; and redirecting, as a function of said accepted information, said first media stream from said interactive response process to said second communication device interfaced to said asynchronous network while maintaining said signaling channel.

64. The method of claim 63, wherein said interactive response process monitors at least one aspect of said first media stream redirected to said second communication device.

65. The method of claim 64, wherein said monitored at least one aspect comprises a call duration.

66. The method of claim 64, wherein said monitoring is accomplished at least in part though signaling via said signaling channel.

67. The method of claim 63, wherein said redirecting said first media stream comprises:

directing a third media stream associated with said second communication device to said first communication device.

68. The method of claim 63, wherein said signaling channel provides out of band signaling between said first communication device and said interactive response process.

69. The method of claim 68, further comprising:

accepting additional information from said first communication device via said signaling channel during a time in which said first media stream is redirected to said second communication device; and redirecting, as a function of said accepted additional information, said first media stream from said second communication device to said interactive response process.

70. The method of claim 69, further comprising:

accepting, by said interactive response process, said first media stream redirected from said second communication device;

generating a third media stream by said interactive response process responsive to said first media stream; and directing said third media stream to said first communication device, wherein said first media stream accepted by said interactive response process and said third media stream directed to said first communication device comprise an interactive dialogue between said first communication device and said interactive response process.

71. The method of claim 70, wherein said dialogue includes dialogue with respect to payment of an additional call.

72. The method of claim 70, wherein said dialogue includes dialogue with respect to a desired third communication device with which said first communication device is to communicate.

73. The method of claim 69, wherein said call payment service comprises a prepaid calling service.

74. The method of claim 69, wherein said call payment service comprises a postpaid calling service.

75. The method of claim 69, wherein said call payment service comprises a collect calling service.

76. The method of claim 63, wherein said interfacing said first communication device to said asynchronous network comprises coupling said first communication device to a network gateway device.

77. The method of claim 63, wherein said first communication device comprises a multimedia personal computer.

78. The method of claim 63, wherein said first media stream comprises a real-time protocol media stream.

79. The method of claim 63, wherein said interactive response process is coupled to said asynchronous network as a network core device.

80. The method of claim 63, wherein said interactive response process is coupled to said asynchronous network via a network core device.

81. The method of claim 80, wherein said network core device is a gatekeeper.

82. A method for providing conference calling services comprising:

interfacing a first communication device to an asynchronous network;

interfacing an interactive response process to said asynchronous network, wherein said interactive response process is adapted to directly utilize packet network protocols;

directing a first media stream associated with said first communication device to said interactive response process;

accepting said first media stream by said interactive response process;

generating a second media stream by said interactive response process responsive to said first media stream;

directing said second media stream to said first communication device, wherein said first media stream accepted by said interactive response process and said second media stream directed to said first communication device comprise an interactive dialogue between said first communication device and said interactive response process including dialogue with respect a desired second communication device with which said first communication device is to communicate and a desired third communication device with which said first communication device is to communicate;

establishing a signaling channel between said first communication device and said interactive response process discrete from said first and second media streams;

accepting information from said first communication device via said signaling channel in accordance with said dialogue;

signaling an asynchronous network interface associated with said first communication device to replicate said first media stream to thereby provide at least a first replication of said first media stream and a second replication of said first media stream, wherein said first replication of said first media stream is directed to said second communication device and said second replication of said first media stream is directed to said third communication device; and terminating direction of said first media stream to said interactive response process while maintaining said signaling channel.

83. The method of claim 82, wherein said second communication device is associated with a conference party, and wherein said third communication device is associated with a conference party.

84. The method of claim 82, further comprising:

signaling an asynchronous network interface associated with said second communication device to replicate a third media stream to thereby provide at least a first replication of said third media stream and a second replication of said third media stream, wherein said first replication of said third media stream is directed to said first communication device and said second replication of said third media stream is directed to said third communication device.

85. The method of claim 84, further comprising:

signaling an asynchronous network interface associated with said third communication device to replicate a fourth media stream to thereby provide at least a first replication of said fourth media stream and a second replication of said fourth media stream, wherein said first replication of said fourth media stream is directed to said first communication device and said second replication of said fourth media stream is directed to said second communication device.

86. The method of claim 82, wherein said interfacing said first communication device to said asynchronous network comprises coupling said first communication device to a network gateway device.

87. The method of claim 82, wherein said first communication device comprises a multimedia personal computer.

88. The method of claim 82, wherein said first communication device comprises a gatekeeper.

89. The method of claim 82, wherein said first media stream comprises a real-time protocol media stream.

90. The method of claim 82, wherein said interactive response process is coupled to said asynchronous network as a network core device.

91. The method of claim 82, wherein said interactive response process is coupled to said asynchronous network via a network core device.

92. The method of claim 91, wherein said network core device is a gatekeeper.

* * * * *